United States Patent
Kawasaki et al.

(10) Patent No.: US 12,297,515 B2
(45) Date of Patent: May 13, 2025

(54) STEEL SHEET, MEMBER, AND METHOD FOR PRODUCING THEM

(71) Applicant: JFE STEEL CORPORATION, Tokyo (JP)

(72) Inventors: Yoshiyasu Kawasaki, Tokyo (JP); Lingling Yang, Tokyo (JP); Shotaro Terashima, Tokyo (JP); Tatsuya Nakagaito, Tokyo (JP); Shunsuke Yamamoto, Tokyo (JP); Katsuya Hoshino, Tokyo (JP); Yuki Takeda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 211 days.

(21) Appl. No.: 17/915,020

(22) PCT Filed: Mar. 25, 2021

(86) PCT No.: PCT/JP2021/012662
§ 371 (c)(1),
(2) Date: Sep. 27, 2022

(87) PCT Pub. No.: WO2021/200580
PCT Pub. Date: Oct. 7, 2021

(65) Prior Publication Data
US 2023/0151451 A1    May 18, 2023

(30) Foreign Application Priority Data

Mar. 31, 2020 (JP) .............................. JP2020-062804
Jul. 16, 2020 (JP) .............................. JP2020-122184

(51) Int. Cl.
| | | |
|---|---|---|
| C21D 8/02 | (2006.01) | |
| B32B 15/01 | (2006.01) | |
| C21D 6/00 | (2006.01) | |
| C21D 9/46 | (2006.01) | |
| C22C 38/00 | (2006.01) | |
| C22C 38/02 | (2006.01) | |
| C22C 38/04 | (2006.01) | |
| C22C 38/06 | (2006.01) | |
| C22C 38/08 | (2006.01) | |
| C22C 38/10 | (2006.01) | |
| C22C 38/12 | (2006.01) | |
| C22C 38/14 | (2006.01) | |
| C22C 38/16 | (2006.01) | |

(Continued)

(52) U.S. Cl.
CPC .............. *C21D 9/46* (2013.01); *B32B 15/013* (2013.01); *C21D 6/001* (2013.01); *C21D 6/002* (2013.01); *C21D 6/005* (2013.01); *C21D 6/007* (2013.01); *C21D 6/008* (2013.01); *C21D 8/0205* (2013.01); *C21D 8/0226* (2013.01); *C21D 8/0236* (2013.01); *C21D 8/0263* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/38* (2013.01); *C22C 38/60* (2013.01); *C23C 2/28* (2013.01); *C23C 2/29* (2022.08); *C21D 2211/001* (2013.01); *C21D 2211/005* (2013.01)

(58) Field of Classification Search
None
See application file for complete search history.

(56) References Cited

U.S. PATENT DOCUMENTS 12,098,439 B2 * 9/2024 Yang ....................... C22C 38/06
2012/0312433 A1 12/2012 Mizuta et al.
(Continued)

FOREIGN PATENT DOCUMENTS

| CN | 103097566 A | 5/2013 |
|---|---|---|
| CN | 110268083 A | 9/2019 |

(Continued)

OTHER PUBLICATIONS

Jun. 8, 2021 International Search Report issued in International Application No. PCT/JP2021/012662.
Aug. 3, 2023 Office Action issued in Chinese Patent Application No. 202180025478.8.
Wang et al. "Research on Bainite-based Ultra-high Strength Steel with Low Yield Ratio and TRIP Effect", Hot Working Process, vol. 43, Issue 24, Dec. 2014, pp. 83-86.
Masui, Takeshi, et al., "Warp Control in Strip Processing Plant". ISIJ International, vol. 31, No. 3, pp. 262-267, 1991.
(Continued)

*Primary Examiner* — Kim S. Horger
(74) *Attorney, Agent, or Firm* — Oliff PLC

(57) ABSTRACT

A steel sheet with a tensile strength (TS) of 1180 MPa or more, a member, and a method for producing them. In a region of the steel sheet within 4.9 μm in the thickness direction, a region with a Si concentration not more than one-third of the Si concentration in the chemical composition of the steel sheet and with a Mn concentration not more than one-third of the Mn concentration in the chemical composition of the steel sheet has a thickness of 1.0 μm or more. The lowest Si concentration $L_{Si}$ and the lowest Mn concentration $L_{Mn}$ in the region within 4.9 μm in the thickness direction from the surface of the steel sheet and a Si concentration $T_{Si}$ and a Mn concentration $T_{Mn}$ at a quarter thickness position of the steel sheet satisfy the following formula (1):

$$L_{Si}+L_{Mn} \leq (T_{Si}+T_{Mn})/4 \qquad (1).$$

24 Claims, No Drawings

(51) Int. Cl.
    *C22C 38/38*     (2006.01)
    *C22C 38/60*     (2006.01)
    *C23C 2/28*     (2006.01)

(56) References Cited

U.S. PATENT DOCUMENTS

| | | |
|---|---|---|
| 2014/0227555 A1 | 8/2014 | Kawata et al. |
| 2016/0312329 A1 | 10/2016 | Hasegawa et al. |
| 2018/0002799 A1* | 1/2018 | Futamura ................ C23C 2/29 |
| 2018/0371570 A1 | 12/2018 | Kim et al. |
| 2020/0230918 A1 | 7/2020 | Morishita et al. |

FOREIGN PATENT DOCUMENTS

| | | |
|---|---|---|
| EP | 2339044 A1 | 6/2011 |
| EP | 2617849 A1 | 7/2013 |
| EP | 2746416 A1 | 6/2014 |
| EP | 3550050 A1 | 10/2019 |
| JP | 2007-302918 A | 11/2007 |
| JP | 2012-188738 A | 10/2012 |
| JP | 2017-2384 A | 1/2017 |
| JP | 6388099 B1 | 9/2018 |
| JP | 2019-504196 A | 2/2019 |
| JP | 6525125 B1 | 6/2019 |
| WO | 2015/092982 A1 | 6/2015 |
| WO | 2016/171237 A1 | 10/2016 |
| WO | 2019/026116 A1 | 2/2019 |
| WO | 2019/077777 A1 | 4/2019 |

OTHER PUBLICATIONS

Jul. 28, 2023 Extended European Search Report issued in European Patent Application No. 21780354.3.
Dec. 21, 2023 Office Action issued in U.S. Appl. No. 17/915,739.

\* cited by examiner

STEEL SHEET, MEMBER, AND METHOD FOR PRODUCING THEM

TECHNICAL FIELD

This application relates to a steel sheet, a member, and a method for producing them. More particularly, the application relates to a steel sheet with a tensile strength (TS) of 1180 MPa or more, a high yield stress (YS), high ductility, high stretch-flangeability (hole expandability), high delayed fracture resistance, and high LME resistance, a member, and a method for producing them. A steel sheet according to the this application is suitable for a structural member used in the automotive field.

BACKGROUND

In recent years, from the viewpoint of global environmental conservation, improvement of fuel efficiency in automobiles has been an important issue. Thus, there is a strong movement under way to strengthen body materials in order to decrease the thicknesses of the body materials and thereby decrease the weight of automobile bodies. Although social demand for automobiles with improved crash safety has become even higher, only steel sheets with a tensile strength (hereinafter also referred to simply as TS) up to 980 MPa grade have been used for structural members exemplified by center pillars. This is because high strength reduces formability, such as ductility and stretch-flangeability (hole expandability). Although improved yield stress (hereinafter also referred to simply as YS) is also desired, it is also difficult to improve YS due to the fear of poor formability as described above.

Furthermore, it has recently been confirmed that spot welding of a high-strength hot-dip galvanized steel sheet and a high-strength hot-dip galvannealed steel sheet or spot welding of a high-strength cold-rolled steel sheet and a galvanized steel sheet causes liquid metal embrittlement cracking (LMEC, hereinafter also referred to as LME cracking) at a weld when assembling automobile bodies and parts. LME cracking is caused by melting of zinc in a galvanized layer during spot welding, penetration of molten zinc into a grain boundary of a steel microstructure of a weld, and the action of stress generated when a welding electrode is opened. Even for an ungalvanized high-strength cold-rolled steel sheet, spot welding with a galvanized steel sheet may cause LME cracking due to contact between zinc melted in the galvanized steel sheet and the high-strength cold-rolled steel sheet. Due to high C, Si, and Mn contents, high-strength steel sheets with a TS of 1180 MPa or more may cause LME cracking.

Various high-strength steel sheets have been developed for automotive parts. For example, Patent Literature 1 discloses a high-strength steel sheet that contains 40% or more by volume of ferrite and 5% or more by volume of tempered martensite, has a ferrite hardness (DHTF) and martensite hardness (DHTM) ratio (DHTM/DHTF) in the range of 1.5 to 3.0, has the remainder microstructure composed of ferrite and bainite microstructures, and has a tensile strength (TS) of 590 MPa or more and high flangeability and formability, and a method for producing the high-strength steel sheet.

Patent Literature 2 discloses a coated steel sheet that has a microstructure containing, on a volume fraction basis, tempered martensite: 3.0% or more, ferrite: 4.0% or more, and retained austenite: 5.0% or more at a quarter thickness position of a steel sheet from a surface of the steel sheet, wherein the tempered martensite in a base material has an average hardness in the range of 5 to 10 GPa, and part or all of the tempered martensite and the retained austenite in the base material form a martensite-austenite constituent (MA), the volume fraction of the ferrite in a decarburized ferrite layer is 120% or more of the volume fraction of the ferrite in the base material at the quarter thickness position of the steel sheet from the surface of the steel sheet, the ferrite in the decarburized ferrite layer has an average grain size of 20 µm or less, the decarburized ferrite layer has a thickness in the range of 5 µm to 200 µm, tempered martensite in the decarburized ferrite layer has a volume fraction of 1.0% or more by volume, the tempered martensite in the decarburized ferrite layer has a number density of $0.01/\mu m^2$ or more, the tempered martensite in the decarburized ferrite layer has an average hardness of 8 GPa or less, and the coated steel sheet can have high strength and improved ductility and bendability, and discloses a method for producing the coated steel sheet.

Patent Literature 3 discloses a steel sheet, a hot-dip galvanized steel sheet, and a hot-dip galvannealed steel sheet that have an internal oxidation layer in which at least part of grain boundaries are covered with an oxide to a depth of 5.0 µm or more from a surface of a base material, the grain boundary coverage of the oxide being 60% or more in a region with a depth up to 5.0 µm from the surface of the base material, and that have a decarburized layer to a depth of 50 µm or more from the surface of the base material, and that have a tensile strength of 900 MPa or more and high resistance to liquid metal embrittlement cracking.

CITATION LIST

Patent Literature

PTL 1: Japanese Unexamined Patent Application Publication No. 2007-302918
PTL 2: International Publication No. WO 2016/171237
PTL 3: Japanese Unexamined Patent No. 6388099

SUMMARY

Technical Problem

However, bendability and LME resistance are not discussed in Patent Literature 1. Hole expandability and LME resistance are not discussed in Patent Literature 2. Ductility and delayed fracture resistance are not discussed in Patent Literature 3.

Thus, there is no steel sheet that can comprehensively satisfy yield stress (YS), tensile strength (TS), ductility, stretch-flangeability (hole expandability), delayed fracture resistance, and LME resistance.

In view of such situations, it is an object of the disclosed embodiments to provide a steel sheet with a tensile strength (TS) of 1180 MPa or more, a high yield stress (YS), high ductility, high stretch-flangeability (hole expandability), high delayed fracture resistance, and high LME resistance, a member, and a method for producing them.

The term "tensile strength (TS)", as used herein, refers to tensile strength (TS) obtained by taking a JIS No. 5 test specimen from a steel sheet prepared in accordance with JIS Z 2241 such that the longitudinal direction is perpendicular to the rolling direction of the steel sheet, and performing a tensile test on the test specimen at a crosshead speed of 10 mm/min.

Furthermore, the phrases "high yield stress" and "high ductility", as used herein, mean that yield stress (YS) and total elongation (El) measured in the same manner as the tensile strength (TS) satisfy the following (A), (B), or (C).

(A) If 1180 MPa≤TS<1320 MPa, then 700 MPa≤YS, 13%≤El (B) If 1320 MPa≤TS<1470 MPa, then 850 MPa≤YS, 11%≤El (C) If 1470 MPa≤TS, then 1000 MPa≤YS, 9%≤El The phrase "high stretch-flangeability (hole expandability)", as used herein, refers to λ of 20% or more in the following hole expanding test according to JIS Z 2256.

(1) A 100 mm×100 mm sample is taken by shearing from a steel sheet, and a hole with a diameter of 10 mm is punched in the sample with a clearance of 12.5%.

(2) While the periphery of the hole is held using a die with an inner diameter of 75 mm at a blank holding force of 9 ton (88.26 kN), the hole diameter at the crack initiation limit is measured by pushing a conical punch with a vertex angle of 60 degrees into the hole.

(3) The critical hole expansion ratio λ (%) is calculated using the following formula, and the hole expandability is evaluated from the critical hole expansion ratio.

$$\lambda(\%) = \{(D_f - D_0)/D_0\} \times 100$$

In this formula, $D_f$ denotes the hole diameter (mm) at the time of cracking, and $D_0$ denotes the initial hole diameter (mm).

The phrase "high delayed fracture resistance", as used herein, refers to no crack of 1 mm or more in a hydrochloric acid immersion test of a V-bending sample subjected to stress described below.

(1) A test specimen 1.4 mm in thickness, 30 mm in width, and 110 mm in length is taken by shearing.

(2) A Φ15 mm hole centered at the center of the width and at 17.5 mm from a longitudinal end of the test specimen is punched.

The conditions for the shearing are as follows: with a blank holder, at a shear rake angle of 0.5 degrees, at a shear clearance of 15%, and with a shear blade used 1000 shots or more.

(3) The test specimen is then subjected to 90-degree V-bending at R/t=5.0, wherein the bend radius (R) is divided by the sheet thickness (t), and the tightening of a bolt through the Φ15 mm hole is adjusted such that the stress at the top of the V-bending is the YS of the material ±50 MPa.

(4) The V-bending sample subjected to the stress is immersed in hydrochloric acid and is checked for cracks. The conditions for the immersion are as follows: an immersion solution of hydrochloric acid with pH=3 under constant control, a liquid temperature of 25° C., and an immersion time of 96 hours.

The phrase "high LME resistance", as used herein, refers to no crack of 0.1 mm or more observed in a resistance welding cracking test described below.

(1) A test specimen of a steel sheet cut to 30 mm×100 mm in a longitudinal direction perpendicular to the rolling direction and another test specimen made of a 980 MPa grade hot-dip galvanized steel sheet are subjected to resistance welding (spot welding) to produce a member.

(2) A set of the two steel sheets tilted 5 degrees is subjected to resistance spot welding in a servomotor pressurization type single-phase alternating current (50 Hz) resistance welding machine attached to a welding gun. The welding conditions include a welding pressure of 3.8 kN, a holding time of 0.2 seconds, a welding current in the range of 5.7 to 6.2 kA, a weld time of 21 cycles, and a holding time of 5 cycles.

(3) A test specimen is cut in half from the welded member, and a cross section is observed with an optical microscope to check for a crack of 0.1 mm or more.

Solution to Problem

As a result of extensive studies to solve the above problems, the present inventors have obtained the following findings.

In the disclosed embodiments, a steel sheet is controlled to have a chemical composition containing predetermined Si and Mn and have a steel microstructure with a ferrite area fraction in the range of 5% to 30%, a bainitic ferrite area fraction in the range of 5% to 35%, a tempered martensite area fraction in the range of 20% to 50%, and a retained austenite volume fraction in the range of 5% to 35%. A steel sheet is also controlled such that a region with low Si and Mn concentrations is present near a surface of the steel sheet and such that the lowest Si concentration $L_{Si}$ and the lowest Mn concentration $L_{Mn}$ in a region within 4.9 μm in a thickness direction from a surface of the steel sheet and the Si concentration $T_{Si}$ and the Mn concentration $T_{Mn}$ at a quarter thickness position from the surface of the steel sheet satisfy a predetermined relationship. It was found that such a steel sheet can have a tensile strength (TS) of 1180 MPa or more, a high yield stress (YS), high ductility, high stretch-flangeability (hole expandability), high delayed fracture resistance, and high LME resistance.

The disclosed embodiments are based on these findings. The gist of the disclosed embodiments can be summarized as follows:

[1] A steel sheet having
a chemical composition containing Si: 0.20% to 2.00% and Mn: 2.70% to 4.00% on a mass percent basis, and
a steel microstructure with a ferrite area fraction in the range of 5% to 30%, a bainitic ferrite area fraction in the range of 5% to 35%, a tempered martensite area fraction in the range of 20% to 50%, and a retained austenite volume fraction in the range of 5% to 35%,
in a region within 4.9 μm in a thickness direction from a surface of the steel sheet, a region with a Si concentration not more than one-third of the Si concentration in the chemical composition of the steel sheet and with a Mn concentration not more than one-third of the Mn concentration in the chemical composition of the steel sheet has a thickness of 1.0 μm or more,
the lowest Si concentration Ls; and the lowest Mn concentration $L_{Mn}$ in the region within 4.9 μm in the thickness direction from the surface of the steel sheet and a Si concentration $T_{Si}$ and a Mn concentration $T_{Mn}$ at a quarter thickness position of the steel sheet satisfy the following formula (1), and
the steel sheet has a tensile strength of 1180 MPa or more.

$$L_{Si} + L_{Mn} \leq (T_{Si} + T_{Mn})/4 \quad (1)$$

[2] The steel sheet according to [1], wherein the chemical composition further contains, on a mass percent basis,
C: 0.120% to 0.400%,
P: 0.001% to 0.100%,
S: 0.0200% or less,
Al: 0.010% to 2.000%, and
N: 0.0100% or less, the remainder being Fe and incidental impurities.

[3] The steel sheet according to [2], wherein the chemical composition further contains, on a mass percent basis, at least one selected from
Sb: 0.200% or less and
Sn: 0.200% or less.

[4] The steel sheet according to [2] or [3], wherein the chemical composition further contains, on a mass percent basis, at least one selected from
Ti: 0.200% or less,
Nb: 0.200% or less,
V: 0.100% or less,
B: 0.0100% or less,
Cu: 1.000% or less,
Cr: 1.000% or less,
Ni: 1.000% or less,
Mo: 0.500% or less,
Ta: 0.100% or less,
W: 0.500% or less,
Mg: 0.0200% or less,
Zn: 0.020% or less,
Co: 0.020% or less,
Zr: 0.020% or less,
Ca: 0.0200% or less,
Ce: 0.0200% or less,
Se: 0.0200% or less,
Te: 0.0200% or less,
Ge: 0.0200% or less,
As: 0.0200% or less,
Sr: 0.0200% or less,
Cs: 0.0200% or less,
Hf: 0.0200% or less,
Pb: 0.0200% or less,
Bi: 0.0200% or less, and
REM (except Ce): 0.0200% or less.

[5] The steel sheet according to any one of [1] to [4], including a soft layer with a thickness in the range of 1.0 to 50.0 μm in the thickness direction from a surface of the steel sheet, the soft layer being a region with hardness corresponding to 65% or less of the hardness at a quarter thickness position from the surface of the steel sheet.

[6] The steel sheet according to any one of [1] to [5], wherein crystal grains containing an oxide of Si and/or Mn in the region within 4.9 μm in the thickness direction from the surface of the steel sheet have an average grain size in the range of 1 to 15 μm.

[7] The steel sheet according to any one of [1] to [6], wherein the Mn concentration $L_{Mn}$ and the Mn concentration $T_{Mn}$ satisfy the following formula (2).

$$L_{Mn} \leq T_{Mn}/3 \tag{2}$$

[8] The steel sheet according to any one of [1] to [7], including a hot-dip galvanized layer or a hot-dip galvannealed layer on a surface of the steel sheet.

[9] The steel sheet according to any one of [1] to [8], wherein the amount of diffusible hydrogen in the steel sheet is 0.50 ppm or less by mass.

[10] The steel sheet according to any one of [1] to [9], wherein the chemical composition has an equivalent carbon content Ceq of 0.697% or more.

[11] A member produced by performing at least one of forming and welding on the steel sheet according to any one of [1] to [10].

[12] A method for producing a steel sheet, including:
a hot-rolling step of hot-rolling a steel slab with the chemical composition according to any one of [1] to [4] followed by coiling at a coiling temperature in the range of 450° C. to 750° C.;
a cold-rolling step of holding the steel sheet after the hot-rolling step in the temperature range of 400° C. or more for 3600 seconds or more, pickling the steel sheet, and cold-rolling the steel sheet at a rolling reduction of 30% or more;
a first annealing step of holding the steel sheet after the cold-rolling step in the temperature range of 820° C. or more for 20 seconds or more;
a second annealing step of holding the steel sheet after the first annealing step in an atmosphere with a dew-point temperature of −35° C. or more in the temperature range of 740° C. to 900° C. for 20 seconds or more, cooling the steel sheet, at an average cooling rate of 8° C./s or more from this temperature range to 550° C., to a cooling stop temperature in the range of 150° C. to 300° C., and bending and unbending the steel sheet 3 to 15 times in total using a roller with a radius in the range of 100 to 1000 mm during the cooling from 740° C. to the cooling stop temperature; and
a reheating step of reheating the steel sheet after the second annealing step to the temperature range of (the cooling stop temperature +50° C.) to 500° C. and holding the steel sheet in this temperature range for 10 seconds or more.

[13] The method for producing a steel sheet according to [12], further including a plating step of performing hot-dip galvanizing on the steel sheet after the reheating step or performing the hot-dip galvanizing followed by reheating to the temperature range of 450° C. to 600° C. and performing alloying treatment.

[14] A method for producing a steel sheet, including:
a hot-rolling step of hot-rolling a steel slab with the chemical composition according to any one of [1] to [4] followed by coiling at a coiling temperature in the range of 450° C. to 750° C.;
a cold-rolling step of holding the steel sheet after the hot-rolling step in the temperature range of 400° C. or more for 3600 seconds or more, pickling the steel sheet, and cold-rolling the steel sheet at a rolling reduction of 30% or more;
a first annealing step of holding the steel sheet after the cold-rolling step in the temperature range of 820° C. or more for 20 seconds or more;
a second annealing step of holding the steel sheet after the first annealing step in an atmosphere with a dew-point temperature of −35° C. or more in the temperature range of 740° C. to 900° C. for 20 seconds or more, cooling the steel sheet, at an average cooling rate of 8° C./s or more from this temperature range to 550° C., to a cooling stop temperature in the range of 350° C. to 500° C., and bending and unbending the steel sheet 3 to 15 times in total using a roller with a radius in the range of 100 to 1000 mm during the cooling from 740° C. to the cooling stop temperature;
a plating step of performing hot-dip galvanizing on the steel sheet after the second annealing step or performing the hot-dip galvanizing followed by reheating to the temperature range of 450° C. to 600° C. and performing alloying treatment; and
a reheating step of cooling the steel sheet after the plating step to a cooling stop temperature in the range of 50° C. to 350° C., reheating the steel sheet to a temperature exceeding the cooling stop temperature and in the range of 300° C. to 500° C., and holding the temperature for 10 seconds or more.

[15] The method for producing a steel sheet according to any one of [12] to [14], further including a dehydrogenation step of holding the steel sheet in the temperature range of 50° C. to 300° C. for 0.5 to 72.0 hours after the reheating step.

[16] The method for producing a steel sheet according to any one of [12] to [15], wherein the chemical composition has an equivalent carbon content Ceq of 0.697% or more.

[17] A method for producing a member, including the step of performing at least one of forming and welding on a steel sheet produced by the method for producing a steel sheet according to any one of [12] to [16].

[18] A steel sheet having
a chemical composition containing Si: 0.20% to 2.00% and Mn: 2.70% to 4.00% on a mass percent basis, and
a steel microstructure with a ferrite area fraction in the range of 5% to 30%, a bainitic ferrite area fraction in the range of 5% to 35%, a tempered martensite area fraction in the range of 20% to 50%, and a retained austenite volume fraction in the range of 5% to 35%,
in a region within 15.0 µm in a thickness direction from a surface of the steel sheet, a region with a Si concentration not more than one-third of the Si concentration in the chemical composition of the steel sheet and with a Mn concentration not more than one-third of the Mn concentration in the chemical composition of the steel sheet has a thickness of 1.0 µm or more,
the lowest Si concentration $L_{Si}$ and the lowest Mn concentration $L_{Mn}$ in the region within 15.0 µm in the thickness direction from the surface of the steel sheet and a Si concentration $T_{Si}$ and a Mn concentration $T_{Mn}$ at a quarter thickness position of the steel sheet satisfy the following formula (1), and
the steel sheet has a tensile strength of 1180 MPa or more.

$$L_{Si}+L_{Mn} \leq (T_{Si}+T_{Mn})/4 \tag{1}$$

[19] The steel sheet according to [18], wherein the chemical composition further contains, on a mass percent basis,
C: 0.120% to 0.400%,
P: 0.001% to 0.100%,
S: 0.0200% or less,
Al: 0.010% to 2.000%, and
N: 0.0100% or less, the remainder being Fe and incidental impurities.

[20] The steel sheet according to [19], wherein the chemical composition further contains, on a mass percent basis, at least one selected from
Sb: 0.200% or less and
Sn: 0.200% or less.

[21] The steel sheet according to [19] or [20], wherein the chemical composition further contains, on a mass percent basis, at least one selected from
Ti: 0.200% or less,
Nb: 0.200% or less,
V: 0.100% or less,
B: 0.0100% or less,
Cu: 1.000% or less,
Cr: 1.000% or less,
Ni: 1.000% or less,
Mo: 0.500% or less,
Ta: 0.100% or less,
W: 0.500% or less,
Mg: 0.0200% or less,
Zn: 0.020% or less,
Co: 0.020% or less,
Zr: 0.020% or less,
Ca: 0.0200% or less,
Ce: 0.0200% or less,
Se: 0.0200% or less,
Te: 0.0200% or less,
Ge: 0.0200% or less,
As: 0.0200% or less,
Sr: 0.0200% or less,
Cs: 0.0200% or less,
Hf: 0.0200% or less,
Pb: 0.0200% or less,
Bi: 0.0200% or less, and
REM (except Ce): 0.0200% or less.

[22] The steel sheet according to any one of [18] to [21], including a soft layer with a thickness in the range of 1.0 to 50.0 µm in the thickness direction from a surface of the steel sheet, the soft layer being a region with hardness corresponding to 65% or less of the hardness at a quarter thickness position from the surface of the steel sheet.

[23] The steel sheet according to any one of [18] to [22], wherein crystal grains containing an oxide of Si and/or Mn in the region within 15.0 µm in the thickness direction from the surface of the steel sheet have an average grain size in the range of 1 to 15 µm.

[24] The steel sheet according to any one of [18] to [23], wherein the Mn concentration $L_{Mn}$ and the Mn concentration $T_{Mn}$ satisfy the following formula (2).

$$L_{Mn} \leq T_{Mn}/3 \tag{2}$$

[25] The steel sheet according to any one of [18] to [24], including a hot-dip galvanized layer or a hot-dip galvannealed layer on a surface of the steel sheet.

[26] The steel sheet according to any one of [18] to [25], wherein the amount of diffusible hydrogen in the steel sheet is 0.50 ppm or less by mass.

[27] The steel sheet according to any one of [18] to [26], wherein the chemical composition has an equivalent carbon content Ceq of 0.697% or more.

[28] A member produced by performing at least one of forming and welding on the steel sheet according to any one of [18] to [27].

[29] A method for producing a steel sheet, including:
a hot-rolling step of hot-rolling a steel slab with the chemical composition according to any one of [18] to [21] followed by coiling at a coiling temperature in the range of 450° C. to 750° C.;
a cold-rolling step of holding the steel sheet after the hot-rolling step in the temperature range of 400° C. or more for 3600 seconds or more, pickling the steel sheet, and cold-rolling the steel sheet at a rolling reduction of 30% or more;
a first annealing step of holding the steel sheet after the cold-rolling step in the temperature range of 820° C. or more for 20 seconds or more;
a second annealing step of holding the steel sheet after the first annealing step in an atmosphere with a dew-point temperature in the range of −35° C. to 20° C. in the temperature range of 740° C. to 900° C. for 20 seconds or more, cooling the steel sheet, at an average cooling rate of 8° C./s or more from this temperature range to 550° C., to a cooling stop temperature in the range of 150° C. to 300° C., and bending and unbending the steel sheet 3 to 15 times in total using a roller with a radius in the range of 100 to 1000 mm during the cooling from 740° C. to the cooling stop temperature; and
a reheating step of reheating the steel sheet after the second annealing step to the temperature range of (the cooling stop temperature +50° C.) to 500° C. and holding the steel sheet in this temperature range for 10 seconds or more.

[30] The method for producing a steel sheet according to [29], further including a plating step of performing hot-dip galvanizing on the steel sheet after the reheating step or performing the hot-dip galvanizing followed by reheating to the temperature range of 450° C. to 600° C. and performing alloying treatment.

[31] A method for producing a steel sheet, including:
a hot-rolling step of hot-rolling a steel slab with the chemical composition according to any one of [18] to [21] followed by coiling at a coiling temperature in the range of 450° C. to 750° C.;
a cold-rolling step of holding the steel sheet after the hot-rolling step in the temperature range of 400° C. or more for 3600 seconds or more, pickling the steel sheet, and cold-rolling the steel sheet at a rolling reduction of 30% or more;
a first annealing step of holding the steel sheet after the cold-rolling step in the temperature range of 820° C. or more for 20 seconds or more;
a second annealing step of holding the steel sheet after the first annealing step in an atmosphere with a dew-point temperature in the range of −35° C. to 20° C. in the temperature range of 740° C. to 900° C. for 20 seconds or more, cooling the steel sheet, at an average cooling rate of 8° C./s or more from this temperature range to 550° C., to a cooling stop temperature in the range of 350° C. to 500° C., and bending and unbending the steel sheet 3 to 15 times in total using a roller with a radius in the range of 100 to 1000 mm during the cooling from 740° C. to the cooling stop temperature;
a plating step of performing hot-dip galvanizing on the steel sheet after the second annealing step or performing the hot-dip galvanizing followed by reheating to the temperature range of 450° C. to 600° C. and performing alloying treatment; and
a reheating step of cooling the steel sheet after the plating step to a cooling stop temperature in the range of 50° C. to 350° C., reheating the steel sheet to a temperature exceeding the cooling stop temperature and in the range of 300° C. to 500° C., and holding the temperature for 10 seconds or more.

[32] The method for producing a steel sheet according to any one of [29] to [31], further including a dehydrogenation step of holding the steel sheet in the temperature range of 50° C. to 300° C. for 0.5 to 72.0 hours after the reheating step.

[33] The method for producing a steel sheet according to any one of [29] to [32], wherein the chemical composition has an equivalent carbon content Ceq of 0.697% or more.

[34] A method for producing a member, including the step of performing at least one of forming and welding on a steel sheet produced by the method for producing a steel sheet according to any one of [29] to [33].

Advantageous Effects of Invention

The disclosed embodiments can provide a steel sheet with a tensile strength (TS) of 1180 MPa or more, a high yield stress (YS), high ductility, high stretch-flangeability (hole expandability), high delayed fracture resistance, and high LME resistance, a member, and a method for producing them.

DETAILED DESCRIPTION

Disclosed embodiments are described below.

First, the appropriate ranges of the chemical composition of a steel sheet and the reasons for limiting the appropriate range are described below. In the following description, unless otherwise specified, "%" of the component element content of a base material steel sheet refers to "% by mass".

A chemical composition of a steel sheet according to the disclosed embodiments contains, on a mass percent basis, Si: 0.20% to 2.00% and Mn: 2.70% to 4.00%. In addition to the Si and Mn, the chemical composition preferably contains, on a mass percent basis, C: 0.1201 to 0.400%, P: 0.001% to 0.100%, S: 0.0200% or less, Al: 0.010% to 2.000%, and N: 0.0100% or less, the remainder being Fe and incidental impurities.

Si: 0.20% to 2.00%

Si is an element that reduces the formation of carbides and promotes the formation of retained austenite while annealing and thereby has an influence on the retained austenite volume fraction and the carbon concentration in retained austenite. Furthermore, a decrease in the Si content increases the melting point of zinc, can suppress the grain boundary erosion of zinc during spot welding, and can improve LME resistance. A Si content of less than 0.20% results in a decrease in retained austenite volume fraction and ductility. On the other hand, a Si content of more than 2.00% results in an excessively increased carbon concentration in retained austenite and results in martensite with greatly increased hardness formed from retained austenite at the time of blanking. These promote crack growth during flange forming and reduce stretch-flangeability (hole expandability). Thus, the Si content ranges from 0.20% to 2.00%. The Si content is preferably 0.70% or more. The Si content is preferably 1.70% or less.

Mn: 2.70% to 4.00%

Mn is an important element to adjust the hard phase area fraction. A Mn content of less than 2.70% results in an increased ferrite area fraction, difficulty in achieving a TS of 1180 MPa or more, and a lower YS. On the other hand, at a Mn content of more than 4.00%, high ductility cannot be achieved. Thus, the Mn content ranges from 2.70% to 4.00%.

C: 0.120% to 0.400%

C is an element that is effective in forming desired amounts of hard phase martensite, tempered martensite, bainite, and retained austenite, achieving a TS of 1180 MPa or more, and ensuring high yield stress (YS). A C content of less than 0.120% may result in an increased ferrite area fraction, difficulty in achieving a TS of 1180 MPa or more, and a lower YS. On the other hand, a C content of more than 0.400% may result in an excessively increased carbon concentration in retained austenite and may result in martensite with greatly increased hardness formed from retained austenite at the time of blanking. These may promote crack growth during flange forming and reduce stretch-flangeability (hole expandability). Thus, the C content preferably ranges from 0.120% to 0.400%. The C content is more preferably 0.150% or more. The C content is more preferably 0.250% or less.

P: 0.001% to 0.100%

P is an element that has a solid-solution strengthening effect and can increase the strength of a steel sheet. To produce these effects, the P content is preferably 0.001% or more. On the other hand, a P content of more than 0.100% may result in segregation at a prior-austenite grain boundary, cause embrittlement of the grain boundary, and therefore result in an increased number of voids after blanking and lower stretch-flangeability (hole expandability). Thus, the P content preferably ranges from 0.001% to 0.100%.

The P content is more preferably 0.030% or less.

S: 0.0200% or Less

S is present as sulfide in steel. A S content of more than 0.0200% may result in a steel sheet with lower ultimate deformability. This may increase the number of voids after blanking and reduce stretch-flangeability (hole expandability). Thus, the S content is preferably 0.0200% or less, more preferably 0.0080% or less. The lower limit of the S content is preferably, but is not limited to, 0.0001% or more due to limited production technology.

Al: 0.010% to 2.000%

Al reduces the formation of carbides and promotes the formation of retained austenite while annealing. Thus, Al is an element that has an influence on the retained austenite volume fraction and the carbon concentration in retained austenite. To produce the effects of the addition of Al, the Al content is preferably 0.010% or more. On the other hand, an Al content of more than 2.000% may result in an increased ferrite area fraction, difficulty in achieving a TS of 1180 MPa or more, and a lower YS. Thus, the Al content preferably ranges from 0.010% to 2.000%. The Al content is more preferably 0.025% or more, still more preferably 0.030% or more. The Al content is more preferably 1.500% or less, still more preferably 1.000% or less.

N: 0.0100% or Less

N is present as nitride in steel. A N content of more than 0.0100% results in a steel sheet with lower ultimate deformability. This may increase the number of voids after blanking and reduce stretch-flangeability (hole expandability). Thus, the N content is preferably 0.0100% or less. The N content is more preferably 0.0050% or less. The lower limit of the N content is preferably, but is not limited to, 0.0005% or more due to limited production technology.

A steel sheet according to the disclosed embodiments has a chemical composition that contains these components and the remainder composed of Fe (iron) and incidental impurities. In particular, a steel sheet according to an embodiment preferably has a chemical composition that contains these components and the remainder composed of Fe and incidental impurities.

A steel sheet according to the disclosed embodiments may further contain the following component elements depending on desired characteristics. The component elements contained below the following upper limits can provide the advantages of the disclosed embodiments. Thus, the component elements do not have particular lower limits and only have the specified upper limits. Any of the following elements contained below appropriate lower limits described below is contained as an incidental impurity.

At least one selected from Sb: 0.200% or less and Sn: 0.200% or less

Sb is an element that is effective in suppressing C diffusion near a surface of a steel sheet while annealing and in controlling the formation of a soft layer near the surface of the steel sheet. An Sb content of more than 0.200% may result in no formation of a soft layer on a surface of a steel sheet and lower stretch-flangeability (hole expandability). Thus, the Sb content is preferably 0.200% or less. The Sb content is more preferably 0.020% or less. On the other hand, for a TS in a more suitable range, the Sb content is preferably 0.002% or more. The Sb content is more preferably 0.005% or more.

Sn is an element that is effective in suppressing C diffusion near a surface of a steel sheet while annealing and in controlling the formation of a soft layer near the surface of the steel sheet. A Sn content of more than 0.200% may result in no formation of a soft layer on a surface of a steel sheet and lower stretch-flangeability (hole expandability). Thus, the Sn content is preferably 0.200% or less. The Sn content is more preferably 0.020% or less. On the other hand, for a TS in a more suitable range, the Sn content is preferably 0.002% or more. The Sn content is more preferably 0.005% or more.

At least one selected from Ti: 0.200% or less, Nb: 0.200% or less, V: 0.100% or less, B: 0.0100% or less, Cu: 1.000% or less, Cr: 1.000% or less, Ni: 1.000% or less, Mo: 0.500% or less, Ta: 0.100% or less, W: 0.500% or less, Mg: 0.0200% or less, Zn: 0.020% or less, Co: 0.020% or less, Zr: 0.020% or less, Ca: 0.0200% or less, Ce: 0.0200% or less, Se: 0.0200% or less, Te: 0.0200% or less, Ge: 0.0200% or less, As: 0.0200% or less, Sr: 0.0200% or less, Cs: 0.0200% or less, Hf: 0.0200% or less, Pb: 0.0200% or less, Bi: 0.0200% or less, and REM (except Ce): 0.0200% or less Ti, Nb, and V form fine carbide, nitride, or carbonitride during hot-rolling or annealing and thereby increase TS. When at least one of Ti, Nb, and V is added, to produce such an effect, at least one of the Ti, Nb, and V contents is preferably 0.001% or more. Each content is preferably 0.005% or more. On the other hand, a Ti content of more than 0.200%, a Nb content of more than 0.200%, or a V content of more than 0.100% may result in the formation of a large number of coarse precipitates and inclusions. In such a case, in the presence of diffusible hydrogen in a steel sheet, a coarse precipitate or inclusion may act as a crack origin in a hole expanding test and reduce stretch-flangeability (hole expandability). Thus, when at least one of Ti, Nb, and V is added, the Ti content is preferably 0.200% or less, the Nb content is preferably 0.200% or less, and the V content is preferably 0.100% or less. Each of the Ti, Nb, and V contents is more preferably 0.060% or less.

B is an element that can be segregated at austenite grain boundaries and thereby improve hardenability. The addition of B to steel can reduce the formation of ferrite and grain growth while annealing and cooling. To produce these effects, the B content is preferably 0.0001% or more. The B content is more preferably 0.0002% or more. On the other hand, a B content of more than 0.0100% may result in a crack in a steel sheet during hot-rolling and result in a steel sheet with lower ultimate deformability. This may increase the total void number density after blanking and reduce stretch-flangeability. Thus, when B is added, the B content is preferably 0.0100% or less. The B content is more preferably 0.0050% or less.

Cu is an element that increases hardenability and is effective in controlling the hard phase area fraction in a more suitable range and TS in a more suitable range. To produce these effects, the Cu content is preferably 0.005% or more. The Cu content is more preferably 0.020% or more. On the other hand, a Cu content of more than 1.000% results in an increased hard phase area fraction and an excessively high TS. Furthermore, this increases the number of coarse precipitates and inclusions, which act as crack origins in a tensile test in the presence of diffusible hydrogen in a steel sheet and may reduce ductility. Thus, when Cu is added, the Cu content is preferably 1.000% or less. The Cu content is more preferably 0.350% or less.

Cr is an element that improves hardenability and is effective in forming a hard phase. A Cr content of more than 1.000% may result in an increased hard martensite area fraction and lower stretch-flangeability (hole expandability). Thus, when Cr is added, the Cr content is preferably 1.000% or less. The Cr content is more preferably 0.700% or less, still more preferably 0.400% or less. Although the Cr content may be 0.0000%, the Cr content is preferably 0.010% or more in terms of high hardenability and a TS in a more suitable range.

Ni is an element that increases hardenability and is effective in controlling the hard phase area fraction in a more suitable range and TS in a more suitable range. To produce these effects, the Ni content is preferably 0.005% or more. The Ni content is more preferably 0.02% or more. On the other hand, a Ni content of more than 1.000% may result in an increased hard phase area fraction and lower dimensional accuracy and ductility at the time of forming. An increase in the number of coarse precipitates and inclusions, which act as crack origins in a hole expanding test in the presence of diffusible hydrogen in a steel sheet, may reduce stretch-flangeability (hole expandability). Thus, when Ni is added, the Ni content is preferably 1.000% or less. The Ni content is more preferably 0.80% or less.

Mo is an element that improves hardenability and is effective in forming a hard phase. A Mo content of more than 0.500% may result in an increased hard martensite area fraction and lower stretch-flangeability (hole expandability). Thus, when Mo is added, the Mo content is preferably 0.500% or less. The Mo content is more preferably 0.450% or less, still more preferably 0.400% or less. The lower limit of the Mo content is preferably 0.010% or more in terms of high hardenability and a TS in a more suitable range. The Mo content is more preferably 0.030% or more.

Like Ti, Nb, and V, Ta forms fine carbide, nitride, or carbonitride during hot-rolling or annealing and thereby increases TS. Furthermore, Ta partially forms a solid solution in Nb carbide or Nb carbonitride, forms complex precipitates, such as (Nb, Ta) (C, N), significantly suppresses coarsening of the precipitates, and stabilizes precipitation strengthening. Thus, Ta is considered to be effective in improving the YS and TS of a base material steel sheet. To produce these effects, the Ta content is preferably 0.001% or more. On the other hand, a Ta content of more than 0.100% results in a large number of coarse precipitates and inclusions, which act as crack origins in a hole expanding test in the presence of diffusible hydrogen in a steel sheet and may reduce stretch-flangeability (hole expandability). Thus, when Ta is added, the Ta content is preferably 0.100% or less. The Ta content is more preferably 0.050% or less, still more preferably 0.030% or less.

W is an element effective in strengthening. A W content of more than 0.500% may result in an increased hard martensite area fraction and lower stretch-flangeability (hole expandability). Thus, when W is added, the W content is preferably 0.500% or less. The W content is more preferably 0.450% or less, still more preferably 0.400% or less. The W content is more preferably 0.200% or less, still more preferably 0.100% or less. The W content is preferably 0.001% or more in terms of high hardenability and a TS in a more suitable range. The W content is more preferably 0.010% or more.

Mg is an element that is effective in spheroidizing the shape of an inclusion of sulfide, oxide, or the like to improve the ultimate deformability and stretch-flangeability (hole expandability) of a steel sheet. To produce these effects, the Mg content is preferably 0.0001% or more. On the other hand, a Mg content of more than 0.0200% may result in a large number of coarse precipitates and inclusions. In such a case, in the presence of diffusible hydrogen in a steel sheet, a precipitate or inclusion may act as a crack origin in a hole expanding test and reduce stretch-flangeability (hole expandability). Thus, when Mg is added, the Mg content is preferably 0.0200% or less. The Mg content is more preferably 0.0100% or less, still more preferably 0.0700% or less.

Zn, Co, and Zr are elements that spheroidize the shape of an inclusion and that are therefore effective in improving the ultimate deformability and stretch-flangeability of a steel sheet. To produce these effects, each of the Zn, Co, and Zr contents is preferably 0.001% or more. On the other hand, a Zn, Co, or Zr content of more than 0.020% may result in a large number of coarse precipitates and inclusions. In such a case, in the presence of diffusible hydrogen in a steel sheet, a precipitate or inclusion may act as a crack origin in a hole expanding test and reduce stretch-flangeability (hole expandability). Thus, when one or two or more of Zn, Co, and Zr are added, each content is preferably 0.020% or less. The total of one or two or more of the Zn, Co, and Zr contents is more preferably 0.015% or less, still more preferably 0.010% or less.

Ca is present as an inclusion in steel. At a Ca content of more than 0.0200%, in the presence of diffusible hydrogen in a steel sheet, the inclusion may act as a crack origin in a hole expanding test and reduce stretch-flangeability (hole expandability). Thus, when Ca is added, the Ca content is preferably 0.0200% or less. The Ca content is preferably 0.0020% or less. Although the lower limit of the Ca content may be 0.0000%, the Ca content is preferably 0.0001% or more due to limited production technology.

Ce, Se, Te, Ge, As, Sr, Cs, Hf, Pb, Bi, and REM (except Ce) are elements that are effective in improving the ultimate deformability and stretch-flangeability (hole expandability) of a steel sheet. To produce these effects, each of the Ce, Se, Te, Ge, As, Sr, Cs, Hf, Pb, Bi, and REM contents is preferably 0.0001% or more. On the other hand, a Ce, Se, Te, Ge, As, Sr, Cs, Hf, Pb, Bi, or REM content of more than 0.0200% may result in a large number of coarse precipitates and inclusions. In such a case, in the presence of diffusible hydrogen in a steel sheet, a precipitate or inclusion may act as a crack origin in a hole expanding test and reduce stretch-flangeability (hole expandability). Thus, when any one of Ce, Se, Te, Ge, As, Sr, Cs, Hf, Pb, Bi, and REM is added, the content thereof is preferably 0.0200% or less. Each of the Ce, Se, Te, Ge, As, Sr, Cs, Hf, Pb, Bi, and REM contents is more preferably 0.0100% or less, still more preferably 0.0070% or less.

The term "REM", as used herein, refers to an element other than Ce among scandium (Sc) with atomic number 21, yttrium (Y) with atomic number 39, and lanthanoids from lanthanum (La) with atomic number 57 to lutetium (Lu) with atomic number 71. The disclosed embodiments refers to the total content of one or two or more elements selected from the REM.

Equivalent Carbon Content Ceq: 0.697% or More

To achieve a TS of 1180 MPa or more, the equivalent carbon content Ceq of a chemical composition in a method for producing a steel sheet according to the disclosed embodiments is preferably 0.697% or more. The equivalent carbon content Ceq may have any upper limit but is preferably less than 0.900% because an excessively high equivalent carbon content Ceq may result in a lower total elongation (hereinafter also referred to simply as El).

The equivalent carbon content Ceq can be determined using the following formula.

$$\text{Equivalent carbon content } Ceq = [C\%] + ([Si\%]/24) + ([Mn\%]/6) + ([Ni\%]/40) + ([Cr\%]/5) + ([Mo\%]/4) + ([V\%]/14)$$

The [element symbol %] in the formula represents the element content (% by mass), and an element not contained is 0.

The equivalent carbon content is calculated in a thickness range except a portion of a soft layer described later.

The steel microstructure of a high-strength steel sheet according to the disclosed embodiments is described below.

A steel sheet according to the disclosed embodiments has a steel microstructure with a ferrite area fraction in the range of 5% to 30%, a bainitic ferrite area fraction in the range of 5% to 35%, a tempered martensite area fraction in the range of 20% to 50%, and a retained austenite volume fraction in the range of 5% to 35%.

Ferrite Area Fraction: 5% to 30%

To achieve high ductility, the ferrite area fraction should be 5% or more. Furthermore, to achieve a TS of 1180 MPa or more and high YS, the soft ferrite area fraction should be 30% or less. The ferrite area fraction is preferably 7% or more. The ferrite area fraction is preferably 25% or less.

Bainitic Ferrite Area Fraction: 5% to 35%

To reduce the difference in hardness between soft ferrite and a hard phase and to achieve high stretch-flangeability (hole expandability), the bainitic ferrite area fraction should be 5% or more. To achieve high ductility, the bainitic ferrite area fraction should be 35% or less. The bainitic ferrite area fraction is preferably 7% or more. The bainitic ferrite area fraction is preferably 30% or less.

Tempered Martensite Area Fraction: 20% to 50%

To reduce the difference in hardness between soft ferrite and a hard phase and to achieve high stretch-flangeability (hole expandability), the tempered martensite area fraction should be 20% or more. To achieve high ductility, the tempered martensite area fraction should be 50% or less. The tempered martensite area fraction is preferably 25% or more.

The ferrite, bainitic ferrite, and tempered martensite area fractions are measured by the following method. The area fraction in the disclosed embodiments is measured at a quarter thickness position. A sample is cut such that a cross section of a steel sheet in the thickness direction parallel to the rolling direction becomes an observation surface. The observation surface is then mirror-polished with a diamond paste, is finally polished with colloidal silica, and is etched with 3' by volume nital to expose a microstructure. Three fields in a 17 µm×23 µm field range are observed with a scanning electron microscope (SEM) at an accelerating voltage of 15 kV and at a magnification of 5000 times. In a microstructure image thus taken, the area fraction is calculated by dividing the area of each constituent microstructure (ferrite, bainitic ferrite, tempered martensite) by the measurement area in three fields using Adobe Photoshop available from Adobe Systems, and the area fractions are averaged to determine the area fraction of each microstructure.

Retained Austenite Volume Fraction: 5% to 35%

5% or more of retained austenite can improve ductility. On the other hand, at a retained austenite volume fraction of more than 35%, when retained austenite, which has a high hydrogen concentration, is processed and transformed into martensite at the time of blanking or in a bending test, a void is formed in the martensite. This increases the number of voids after blanking and reduces stretch-flangeability (hole expandability). Thus, the retained austenite volume fraction ranges from 5% to 35%. The retained austenite volume fraction is preferably 7% or more. The retained austenite volume fraction is preferably 30% or less.

The retained austenite volume fraction is measured by the following method. A steel sheet was mechanically ground in the thickness direction (depth direction) to a quarter thickness and was then chemically polished with oxalic acid to form an observation surface. The observation surface was observed by X-ray diffractometry. A Mo Kα radiation source was used for incident X-rays. The ratio of the diffraction intensities of (200), (220), and (311) planes of fcc iron (austenite) to the diffraction intensities of (200), (211), and (220) planes of bcc iron was determined as the retained austenite volume fraction.

A steel microstructure according to the disclosed embodiments may also contain a carbide, such as fresh martensite, pearlite, or cementite, or another known steel sheet microstructure in the remainder other than ferrite, tempered martensite, bainitic ferrite, and retained austenite. From the perspective of the advantages of the disclosed embodiments, the area fraction of the remainder is preferably 20% or less. The remainder more preferably constitutes 15% or less. The other steel sheet microstructure (remaining microstructure) may be determined by SEM observation, for example.

In a region within 4.9 µm in a thickness direction from a surface of a steel sheet, the thickness of a region with a Si concentration not more than one-third of the Si concentration in the chemical composition of the steel sheet and with a Mn concentration not more than one-third of the Mn concentration in the chemical composition of the steel sheet: 1.0 µm or more The thickness of 1.0 µm or more is a very important constituent feature of the disclosed embodiments. In a region within 4.9 µm in a thickness direction from a surface of a steel sheet, high delayed fracture resistance and LME resistance can be achieved when a region with a Si concentration not more than one-third of the Si concentration in the chemical composition of the steel sheet and with a Mn concentration not more than one-third of the Mn concentration in the chemical composition of the steel sheet has a thickness of 1.0 µm or more. On the other hand, when the region has a thickness of less than 1.0 µm, LME cracking occurs in angled spot welding. The region preferably has a thickness of 3.0 µm or more. In the disclosed embodiments, it is important that the region is present within 4.9 µm from a surface of a steel sheet, and it is sufficient if the region has a thickness of 1.0 µm or more. The upper limit of the thickness of the region is not particularly limited from the perspective of the advantages of the disclosed embodiments, and the region may have a thickness of 4.9 µm. The Si concentration and the Mn concentration are expressed in % by mass.

The lowest Si concentration $L_{Si}$ and the lowest Mn concentration $L_{Mn}$ in the region within 4.9 µm in the thickness direction from the surface of the steel sheet and a Si concentration $T_{Si}$ and a Mn concentration $T_{Mn}$ at a quarter thickness position of the steel sheet satisfy the following formula (1).

$$L_{Si}+L_{Mn} \leq (T_{Si}+T_{Mn})/4 \qquad (1)$$

Satisfying the formula (1) is a very important constituent feature of the disclosed embodiments. Satisfying the formula (1) can achieve high delayed fracture resistance and LME resistance. On the other hand, in the case of $L_{Si}+L_{Mn}>(T_{Si}+T_{Mn})/4$, LME cracking occurs in angled spot welding.

The Mn concentration $L_{Mn}$ and the Mn concentration $T_{Mn}$ preferably satisfy the following formula (2). Satisfying the formula (2) can achieve higher delayed fracture resistance and LME resistance.

$$L_{Mn} \leq T_{Mn}/3 \qquad (2)$$

A steel sheet with high LME resistance can be produced without significantly increasing the production costs of the steel sheet by controlling the region within 4.9 μm in the thickness direction from the surface of the steel sheet. To produce a steel sheet with higher LME resistance, it is important to control a region within 15.0 m in the thickness direction from the surface of the steel sheet.

In the disclosed embodiments, in a region within 15.0 μm in a thickness direction from a surface of a steel sheet, a region with a Si concentration not more than one-third of the Si concentration in the chemical composition of the steel sheet and with a Mn concentration not more than one-third of the Mn concentration in the chemical composition of the steel sheet has a thickness of 1.0 μm or more.

The thickness of 1.0 μm or more is a very important constituent feature of the disclosed embodiments. In a region within 15.0 μm in a thickness direction from a surface of a steel sheet, good fatigue properties and high LME resistance can be achieved when a region with a Si concentration not more than one-third of the Si concentration in the chemical composition of the steel sheet and with a Mn concentration not more than one-third of the Mn concentration in the chemical composition of the steel sheet has a thickness of 1.0 μm or more. On the other hand, when the region has a thickness of less than 1.0 μm, LME cracking occurs in angled spot welding. The region preferably has a thickness of 3.0 μm or more. In the disclosed embodiments, the region is preferably present within 15.0 μm from a surface of a steel sheet, and it is sufficient if the region has a thickness of 1.0 μm or more. The upper limit of the thickness of the region is not particularly limited from the perspective of the advantages of the disclosed embodiments, and the region may have a maximum thickness of 15.0 μm. The Si concentration and the Mn concentration are expressed in % by mass.

The lowest Si concentration $L_{Si}$ and the lowest Mn concentration $L_{Mn}$ in the region within 15.0 μm in the thickness direction from the surface of the steel sheet and a Si concentration $T_{Si}$ and a Mn concentration $T_{Mn}$ at a quarter thickness position of the steel sheet satisfy the following formula (1).

$$L_{Si}+L_{Mn} \leq (T_{Si}+T_{Mn})/4 \quad (1)$$

Satisfying the formula (1) is a very important constituent feature of the disclosed embodiments. Satisfying the formula (1) can achieve good fatigue properties and high LME resistance. On the other hand, in the case of $L_{Si}+L_{Mn}>(T_{Si}+T_{Mn})/4$, LME cracking occurs in angled spot welding.

The Mn concentration $L_{Mn}$ and the Mn concentration $T_{Mn}$ preferably satisfy the following formula (2). Satisfying the formula (2) can achieve better fatigue properties and higher LME resistance.

$$L_{Mn} \leq T_{Mn}/3 \quad (2)$$

The Si concentration $T_{Si}$ and the Mn concentration $T_{Mn}$ at a quarter thickness position of a steel sheet are determined with a field emission-electron probe micro analyzer (FE-EPMA) from the average of 10 points of point analysis at an electron beam diameter of 1 μm at a quarter thickness position of the steel sheet. For the Si concentration in a region within 4.9 μm in a thickness direction from a surface of a steel sheet, the concentration distribution of the Si concentration in the range of 0 to 4.9 μm in the thickness direction from the surface of the steel sheet is determined by line analysis with a field emission-electron probe micro analyzer at an electron beam diameter of 0.1 μm from the surface of the steel sheet in the thickness direction. The lowest Si concentration in the concentration distribution is defined as the concentration $L_{Si}$. Also for the Mn concentration in the region within 4.9 μm in the thickness direction from the surface of the steel sheet, the concentration distribution of the Mn concentration in the range of 0 to 4.9 μm in the thickness direction from the surface of the steel sheet is determined by line analysis with a field emission-electron probe micro analyzer at an electron beam diameter of 0.1 m from the surface of the steel sheet in the thickness direction. The lowest Mn concentration in the concentration distribution is defined as the concentration $L_{Mn}$.

Furthermore, when the Si concentration and the Mn concentration in a region within 15.0 μm in a thickness direction from a surface of a steel sheet are controlled, also for the Si concentration in the region within 15.0 μm in the thickness direction from the surface of the steel sheet, the concentration distribution of the Si concentration in the range of 0 to 15.0 μm in the thickness direction from the surface of the steel sheet is determined by line analysis with a field emission-electron probe micro analyzer at an electron beam diameter of 0.1 μm from the surface of the steel sheet in the thickness direction. The lowest Si concentration in the concentration distribution is defined as the concentration $L_{Si}$.

Also for the Mn concentration in a region within 15.0 μm in a thickness direction from a surface of a steel sheet, the concentration distribution of the Mn concentration in the range of 0 to 15.0 μm in the thickness direction from the surface of the steel sheet is determined by line analysis with a field emission-electron probe micro analyzer at an electron beam diameter of 0.1 μm from the surface of the steel sheet in the thickness direction. The lowest Mn concentration in the concentration distribution is defined as the concentration $L_{Mn}$.

The Si concentration, the Mn concentration, $L_{Si}$, $T_{Si}$, $L_{Mn}$, and $T_{Mn}$ are expressed in % by mass. In the measurement of the Si concentration and the Mn concentration with a field emission-electron probe micro analyzer in the disclosed embodiments, 10 positions without particulate matter are measured and averaged as the Si concentration and the Mn concentration.

Thickness of Soft Layer: 1.0 to 50.0 μm

The term "soft layer", as used herein, refers to a region with hardness corresponding to 65% or less of the hardness at a quarter thickness position from a surface of a steel sheet. A soft layer with a thickness in the range of 1.0 to 50.0 μm in the thickness direction from a surface of a steel sheet can provide higher stretch-flangeability and LME resistance. To produce these effects, a soft layer with a thickness of 1.0 μm or more is preferably formed in the thickness direction from a surface of a steel sheet. On the other hand, to achieve high delayed fracture resistance and a TS of 1180 MPa or more, it is preferable to have a soft layer with a thickness of 50.0 μm or less in the thickness direction from the surface of the steel sheet. It is more preferable to have a soft layer with a thickness of 40.0 μm or less in the thickness direction from the surface of the steel sheet.

The soft layer may be present in a region overlapping the "region with a Si concentration not more than one-third of the Si concentration in the chemical composition of the steel sheet and with a Mn concentration not more than one-third of the Mn concentration in the chemical composition of the steel sheet in the region within 4.9 μm in the thickness direction from the surface of the steel sheet".

The soft layer may be present in a region overlapping the "region with a Si concentration not more than one-third of the Si concentration in the chemical composition of the steel sheet and with a Mn concentration not more than one-third of the Mn concentration in the chemical composition of the steel sheet in the region within 15.0 μm in the thickness direction from the surface of the steel sheet".

Measurement is performed on the soft layer as described below. After smoothing a thickness cross section (L cross section: a cross section parallel to the rolling direction and perpendicular to the surface of the steel sheet) parallel to the rolling direction of the steel sheet by wet grinding, measurement is performed with a Vickers hardness tester at a load of 10 gf from a 1-μm position to a 100-μm position in the thickness direction from the surface of the steel sheet at intervals of 1 μm. Measurement is then performed at intervals of 20 μm to the central portion in the thickness direction.

A region with hardness corresponding to 65% or less of the hardness at a quarter thickness position is defined as a soft layer, and the thickness of the region in the thickness direction is defined as the thickness of the soft layer.

Average grain size of crystal grains containing an oxide of Si and/or Mn in a region within 4.9 μm in a thickness direction from a surface of a steel sheet: 1 to 15 μm The phrase "crystal grains containing an oxide of Si and/or Mn", as used herein, refers to oxide grains containing one or more granular oxides of Si and/or Mn in the grains. When crystal grains containing an oxide of Si and/or Mn in a region within 4.9 μm in a thickness direction from a surface of a steel sheet have an average grain size of 1 μm or more, the crystal grains themselves have high deformability, and therefore higher LME resistance can be achieved. When crystal grains containing an oxide of Si and/or Mn in the region within 4.9 μm in the thickness direction from the surface of the steel sheet have an average grain size of 15 μm or less, higher delayed fracture resistance can be achieved. Thus, the average grain size preferably ranges from 1 to 15 μm.

In the disclosed embodiments, SEM observation and energy dispersive X-ray analysis (EDX) on a cross section (L cross section) of a steel sheet are performed to determine the type of oxide in the region within 4.9 μm in the thickness direction from the surface of the steel sheet and to measure the average grain size of crystal grains containing an oxide of Si and/or Mn. The average grain size of crystal grains is the average of grain sizes measured by microtomy in a cross section (L cross section) of a steel sheet in a direction parallel to the surface of the steel sheet.

Average grain size of crystal grains containing an oxide of Si and/or Mn in a region within 15.0 μm in a thickness direction from a surface of a steel sheet: 1 to 15 μm When the Si concentration and Mn concentration in a region within 15.0 μm in a thickness direction from a surface of a steel sheet are controlled, the phrase "crystal grains containing an oxide of Si and/or Mn", as used herein, refers to oxide grains containing one or more granular oxides of Si and/or Mn within the grains. When crystal grains containing an oxide of Si and/or Mn in the region within 15.0 μm in the thickness direction from the surface of the steel sheet have an average grain size of 1 m or more, the crystal grains themselves have high deformability, and therefore still higher LME resistance can be achieved. When crystal grains containing an oxide of Si and/or Mn in the region within 15.0 μm in the thickness direction from the surface of the steel sheet have an average grain size of 15 μm or less, better fatigue properties can be achieved. Thus, the average grain size preferably ranges from 1 to 15 μm.

In the disclosed embodiments, SEM observation and energy dispersive X-ray analysis (EDX) on a cross section (L cross section) of a steel sheet are performed to determine the type of oxide in the region within 15.0 μm in the thickness direction from the surface of the steel sheet and to measure the average grain size of crystal grains containing an oxide of Si and/or Mn. The average grain size of crystal grains is the average of grain sizes measured by microtomy in a cross section (L cross section) of a steel sheet in a direction parallel to the surface of the steel sheet.

A steel sheet according to the disclosed embodiments may have a hot-dip galvanized layer or a hot-dip galvannealed layer on the surface of the steel sheet. The hot-dip galvanized layer and the hot-dip galvannealed layer may have any composition and may be formed by any method.

The hot-dip galvanized layer has a composition that contains, for example, Fe: 20% or less by mass and Al: 0.001% to 1.0% by mass and further contains one or two or more selected from the group consisting of Pb, Sb, Si, Sn, Mg, Mn, Ni, Cr, Co, Ca, Cu, Li, Ti, Be, Bi, and REM in a total amount of 0% to 3.5% by mass, the remainder being Zn and incidental impurities. The Fe content of the hot-dip galvanized layer is preferably less than 7% by mass. The Fe content of the hot-dip galvannealed layer is preferably 7% or more by mass, more preferably 8% or more by mass. The Fe content of the hot-dip galvannealed layer is preferably 15% or less by mass, more preferably 12% or less by mass.

The coating weight is preferably, but is not limited to, in the range of 20 to 80 g/m$^2$ per side of a steel sheet.

Amount of Diffusible Hydrogen in Steel Sheet: 0.50 ppm or Less by Mass

The amount of diffusible hydrogen in a steel sheet according to the disclosed embodiments is preferably 0.50 ppm or less by mass in terms of higher stretch-flangeability (hole expandability). The amount of diffusible hydrogen in a steel sheet is more preferably 0.35 ppm or less by mass. The amount of diffusible hydrogen in a steel sheet may have any lower limit and is often 0.01 ppm by mass or more due to limited production technology. A steel sheet for which the amount of diffusible hydrogen is measured may be a steel sheet without a coated layer or a base material steel sheet of a steel sheet with a hot-dip galvanized layer or a hot-dip galvannealed layer. The amount of diffusible hydrogen may be measured in a base material steel sheet of a member subjected to forming, such as blanking or stretch flange forming, or in a base material steel sheet of a product (member) produced by welding a steel sheet after forming. For a product (member) after forming or welding a steel sheet, when the amount of diffusible hydrogen in steel is measured by cutting a sample from the product in a typical use environment, 0.50 ppm or less by mass of diffusible hydrogen in the steel indicates 0.50 ppm or less by mass of diffusible hydrogen before the forming or welding.

The amount of diffusible hydrogen in a steel sheet is measured by the following method. For a cold-rolled steel sheet, a test specimen 30 mm in length and 5 mm in width is taken. For a steel sheet with a hot-dip galvanized layer or a hot-dip galvannealed layer on its surface, a test specimen 30 mm in length and 5 mm in width is taken, and the hot-dip galvanized layer or hot-dip galvannealed layer is removed with alkali. The amount of hydrogen released from the test specimen is then measured by a temperature-programmed desorption analysis method. More specifically, a test specimen is continuously heated from room temperature to 300° C. at a heating rate of 200° C./h and is then cooled to room temperature. The cumulative amount of hydrogen released from the test specimen from room temperature to 210° C. is measured as the amount of diffusible hydrogen in the steel sheet.

A steel sheet according to the disclosed embodiments may have any thickness, preferably in the range of 0.5 mm to 3.0 mm.

A method for producing a steel sheet according to the disclosed embodiments is described below. Unless otherwise specified, the temperature at which a steel slab (steel material), a steel sheet, or the like described below is heated or cooled refers to the surface temperature of the steel slab, the steel sheet, or the like.

First Embodiment

A first embodiment of a method for producing a steel sheet according to the disclosed embodiments includes a hot-rolling step of hot-rolling a steel slab with the chemical composition described above followed by coiling at a coiling temperature in the range of 450° C. to 750° C., a cold-rolling step of holding the steel sheet after the hot-rolling step in the temperature range of 400° C. or more for 3600 seconds or more, pickling the steel sheet, and cold-rolling the steel sheet at a rolling reduction of 30% or more, a first annealing step of holding the steel sheet after the cold-rolling step in the temperature range of 820° C. or more for 20 seconds or more, a second annealing step of holding the steel sheet after the first annealing step in an atmosphere with a dew-point temperature of −35° C. or more in the temperature range of 740° C. to 900° C. for 20 seconds or more, cooling the steel sheet, at an average cooling rate of 8° C./s or more from this temperature range to 550° C., to a cooling stop temperature in the range of 150° C. to 300° C., and bending and unbending the steel sheet 3 to 15 times in total using a roller with a radius in the range of 100 to 1000 mm during the cooling from 740° C. to the cooling stop temperature, and a reheating step of reheating the steel sheet after the second annealing step to the temperature range of (the cooling stop temperature +50° C.) to 500° C. and holding the steel sheet in this temperature range for 10 seconds or more. The method for producing a steel sheet according to the first embodiment is described below.

First, a steel slab with the chemical composition described above is produced. First, a steel material is obtained by steelmaking to produce a molten steel with the chemical composition described above. A method of obtaining a steel material by steelmaking may be, but is not limited to, any known method using a converter, an electric arc furnace, or the like. The molten steel is solidified to produce a steel slab (slab). The steel slab may be produced from the molten steel by any method, such as a continuous casting method, an ingot casting method, or a thin slab casting method. To prevent macrosegregation, the steel slab is preferably produced by the continuous casting method.

The produced steel slab is then subjected to hot-rolling composed of rough rolling and finish rolling to form a hot-rolled steel sheet.

In one example, the steel slab produced as described above is temporarily cooled to room temperature and is then slab heated and rolled. The slab heating temperature is preferably 1100° C. or more to melt a carbide and to reduce rolling force. The slab is preferably heated to 1300° C. or less to prevent an increase in scale loss. The slab heating temperature is based on the temperature of the heated slab surface.

The hot-rolling may be performed in an energy-saving process. The energy-saving process may be hot charge rolling in which a produced steel slab is not cooled to room temperature and is charged into a furnace as a hot piece for hot-rolling, or hot direct rolling in which a produced steel slab is kept slightly warm and is then immediately rolled.

The steel slab is then roughly rolled under ordinary conditions to form a sheet bar. The sheet bar is finish-rolled to form a hot-rolled steel sheet. When the slab is heated at a slightly lower temperature, the sheet bar is preferably heated with a bar heater or the like before finish rolling to prevent trouble in the finish rolling. The finish rolling temperature is preferably equal to or higher than the Ar3 transformation temperature in order to reduce the rolling load and because a high rolling reduction of austenite in an unrecrystallized state may develop an abnormal microstructure elongated in the rolling direction and may reduce the workability of an annealed sheet.

The finish rolling may be continuously performed by joining rough-rolled sheets together during the hot-rolling. A rough-rolled sheet (sheet bar) may be temporarily coiled before the finish rolling. Furthermore, to reduce the rolling force during the hot-rolling, the finish rolling may be partly or entirely lubrication rolling. Lubrication rolling is also effective in making the shape of a steel sheet and the quality of material uniform. The friction coefficient for the lubrication rolling preferably ranges from 0.10 to 0.25.

Coiling Temperature: 450° C. to 750° C.

After hot-rolling the steel slab, the hot-rolled steel sheet is coiled and recovered. At a coiling temperature to 450° C. or more, C diffuses into an oxide scale formed during hot-rolling. More specifically, this promotes decarburization near the surface of the steel sheet and facilitates the formation of a soft layer with a desired thickness in the thickness direction from the surface of the annealed steel sheet. Furthermore, in a region within 4.9 μm in the thickness direction from the surface of the annealed steel sheet, it is possible to form a region with a Si concentration not more than one-third of the Si concentration in the chemical composition of the steel sheet and with a Mn concentration not more than one-third of the Mn concentration in the chemical composition of the steel sheet. This can achieve high delayed fracture resistance and high LME resistance. On the other hand, at a coiling temperature of more than 750° C., in the annealed steel sheet, a soft layer with an excessive thickness is formed in the thickness direction from the surface of the steel sheet, and high delayed fracture resistance may be difficult to be achieved. Thus, the coiling temperature after the hot-rolling ranges from 450° C. to 750° C. In the region within 4.9 μm in the thickness direction from the surface of the annealed steel sheet, to form 1.0 μm or more of a region with a Si concentration not more than one-third of the Si concentration in the chemical composition of the steel sheet and with a Mn concentration not more than one-third of the Mn concentration in the chemical composition of the steel sheet, the coiling temperature after the hot-rolling is preferably 550° C. or more. The coiling temperature after the hot-rolling is preferably 700° C. or less. Furthermore, in the region within 15.0 μm in the thickness direction from the surface of the annealed steel sheet, to form 1.0 μm or more of a region with a Si concentration not more than one-third of the Si concentration in the chemical composition of the steel sheet and with a Mn concentration not more than one-third of the Mn concentration in the chemical composition of the steel sheet, the coiling temperature after the hot-rolling is preferably 600° C. or more. The coiling temperature after the hot-rolling is preferably 750° C. or less.

Holding Time in the Temperature Range of 400° C. or More: 3600 Seconds or More

This is a very important constituent feature of the disclosed embodiments. At a holding time of 3600 seconds or more in the temperature range of 400° C. or more after coiling the hot-rolled steel sheet, C diffuses into an oxide scale formed during the hot-rolling. More specifically, this promotes decarburization near the surface of the steel sheet and facilitates the formation of a soft layer with a desired thickness in the thickness direction from the surface of the annealed steel sheet. Furthermore, in a region within 4.9 μm in the thickness direction from the surface of the annealed steel sheet, it is possible to form a region with a Si concentration not more than one-third of the Si concentration in the chemical composition of the steel sheet and with a Mn concentration not more than one-third of the Mn concentration in the chemical composition of the steel sheet. Furthermore, in a region within 15.0 μm in the thickness direction from the surface of the annealed steel sheet, it is possible to form a region with a Si concentration not more than one-third of the Si concentration in the chemical composition of the steel sheet and with a Mn concentration not more than one-third of the Mn concentration in the chemical composition of the steel sheet. This can achieve high delayed fracture resistance and high LME resistance. Thus, the holding time in the temperature range of 400° C. or more after the coiling is 3600 seconds or more. The holding time is preferably 10,000 seconds or more. The holding time may have any upper limit but is preferably 10 hours or less because the effects are saturated at a holding time of more than 10 hours.

The hot-rolled steel sheet is then pickled. Pickling can remove oxides from the surface of the steel sheet and is therefore important for good chemical conversion treatability and the quality of coating of the steel sheet of the end product. The pickling may be performed once or multiple times.

The hot-rolled steel sheet after the pickling is then cold-rolled to form a cold-rolled steel sheet. In the disclosed embodiments, the cold-rolling is performed by multi-pass rolling requiring two or more passes, such as tandem multi-stand rolling or reverse rolling.

Rolling Reduction in Cold-Rolling: 30% or More

When the rolling reduction of the cold-rolling is 30% or more, recrystallization proceeds while heating in the next step, and the ferrite area fraction can be 5% or more. This can result in high ductility. Thus, the rolling reduction in the cold-rolling is 30% or more, preferably 35% or more. On the other hand, although the rolling reduction of the cold-rolling may have any upper limit, a rolling reduction of more than 75% may result in a steel sheet of poor shape and an uneven coating weight in galvanization of the final steel sheet. Thus, the rolling reduction of the cold-rolling is preferably 75% or less, more preferably 70% or less.

The number of rolling passes in the cold-rolling and the rolling reduction in passes other than the final pass and the pass immediately before the final pass are not particularly limited.

The cold-rolled steel sheet thus formed is then annealed. In the disclosed embodiments, annealing twice can form fine retained austenite and improve ductility and stretch-flangeability (hole expandability).

Annealing Temperature in First Annealing: 820° C. or More, Holding Time: 20 Seconds or More In the initial annealing step (first annealing step), the cold-rolled steel sheet is held in the temperature range of 820° C. or more for 20 seconds or more. When the annealing temperature is less than 820° C. or when the holding time in this temperature range is less than 20 seconds, heat treatment is performed in a two-phase region of ferrite and austenite. This increases the ferrite area fraction and the martensite area fraction in the microstructure after the second annealing and decreases the YS. Furthermore, as the martensite area fraction increases, the amount of diffusible hydrogen in the steel sheet also increases, and this decreases the number of voids after blanking and reduces the stretch-flangeability (hole expandability). The annealing temperature in the first annealing is preferably 830° C. or more. The annealing temperature in the first annealing is preferably 920° C. or less. The holding time at the annealing temperature in the first annealing is preferably, but is not limited to, 600 seconds or less in terms of strength.

The steel sheet after the initial annealing step (first annealing step) is, if necessary, cooled to room temperature and pickled before the second annealing.

The method for cooling from the annealing temperature may be, but is not limited to, gas jet cooling, roll cooling, mist cooling, water cooling, or air cooling.

Annealing Temperature in Second Annealing: 740° C. to 900° C., Holding Time: 20 Seconds or More, Dew-Point Temperature: −35° C. or More In the next annealing step (second annealing step), first, the steel sheet after the initial annealing step (first annealing step) is held in an atmosphere with a dew-point temperature of −35° C. or more in the temperature range of 740° C. to 900° C. for 20 seconds or more. When the annealing temperature is less than 740° C. or when the holding time in this temperature range is less than 20 seconds, austenite is insufficiently formed while heating in a two-phase region of ferrite and austenite. This decreases the tempered martensite and martensite area fractions and the retained austenite volume fraction after the annealing and increases the ferrite area fraction, thus making it difficult to achieve a TS of 1180 MPa or more. On the other hand, at an annealing temperature of more than 900° C., austenite grains grow while heating in an austenite single phase region. This decreases the ferrite area fraction and the retained austenite volume fraction after the annealing and decreases El. Thus, the second annealing temperature ranges from 740° C. to 900° C. The annealing temperature in the second annealing is preferably 760° C. or more. The annealing temperature in the second annealing is preferably 860° C. or less. The holding time at the annealing temperature in the second annealing is preferably, but is not limited to, 600 seconds or less.

Furthermore, the dew-point temperature of the atmosphere at the annealing temperature in the second annealing is −35° C. or more. This enables the formation of a region 1.0 μm or more in thickness with a Si concentration not more than one-third of the Si concentration in the chemical composition of the steel sheet and with a Mn concentration not more than one-third of the Mn concentration in the chemical composition of the steel sheet in a region within 4.9 μm in the thickness direction from the surface of the steel sheet. The lowest Si concentration $L_{Si}$ and the lowest Mn concentration $L_{Mn}$ in the region within 4.9 μm in the thickness direction from the surface of the steel sheet and a Si concentration $T_{Si}$ and a Mn concentration $T_{Mn}$ at a quarter thickness position of the steel sheet satisfy $L_{Si}+L_{Mn} \leq (T_{Si}+T_{Mn})/4$. These can achieve high delayed fracture resistance and LME resistance. Furthermore, these facilitate the formation of a soft layer with a desired thickness in the thickness direction from the surface of the steel sheet and make it easy to achieve higher delayed fracture resistance and LME resistance. The upper limit of the dew-point temperature at the second annealing temperature is preferably, but is not limited to, 15° C. or less, more preferably 5° C. or less, to achieve a TS in a suitable range. The dew-point temperature at the second annealing temperature is preferably −20° C. or more, more preferably −10° C. or more. This enables the formation of a region 1.0 μm or more in thickness with a Si concentration not more than one-third of the Si concentration in the chemical composition of the steel sheet and with a Mn concentration not more than one-third of the Mn concentration in the chemical composition of the steel sheet in a region within 4.9 μm in the thickness direction from the surface of the steel sheet.

Furthermore, to form a region 1.0 μm or more in thickness with a Si concentration not more than one-third of the Si concentration in the chemical composition of the steel sheet and with a Mn concentration not more than one-third of the Mn concentration in the chemical composition of the steel sheet in the region within 15.0 μm in the thickness direction from the surface of the steel sheet, the dew-point temperature at the second annealing temperature should range from −35° C. to 20° C., preferably −20° C. or more. As a result of such control, the lowest Si concentration $L_{Si}$ and the lowest Mn concentration $L_{Mn}$ in the region within 15.0 μm in the thickness direction from the surface of the steel sheet and a Si concentration $T_{Si}$ and a Mn concentration $T_{Mn}$ at a quarter thickness position of the steel sheet satisfy $L_{Si}+L_{Mn} \leq (T_{Si}+T_{Mn})/4$. These can achieve the best fatigue properties and high LME resistance.

Average Cooling Rate from Annealing Temperature to 550° C. in Second Annealing: 8° C./s or More The steel sheet after the second annealing is cooled, at an average cooling rate of 8° C./s or more from the annealing temperature to 550° C., to a cooling stop temperature in the range of 150° C. to 300° C. At an average cooling rate of 8° C./s or more, the ferrite area fraction can be controlled in a desired range, and the YS can be in a desired range. This can also suppress carbon distribution between a soft phase ferrite and a hard phase quenched martensite and improves stretch-flangeability (hole expandability). The average cooling rate is preferably 12° C./s or more. Although the average cooling rate may have any upper limit, an average cooling rate of more than 100° C./s may make it impossible while cooling to desorb diffusible hydrogen that has penetrated into the steel sheet while annealing, increase the amount of diffusible hydrogen in the steel sheet, and make it difficult to improve the stretch-flangeability (hole expandability) and LME resistance.

Thus, to further improve the bendability and LME resistance, the average cooling rate is preferably 100° C./s or less. The cooling method may be, but is not limited to, gas jet cooling, roll cooling, mist cooling, water cooling, or air cooling.

Cooling Stop Temperature: 150° C. to 300° C.

The second annealing is followed by cooling to a cooling stop temperature in the range of 150° C. to 300° C. A cooling stop temperature equal to or lower than the martensite start temperature can result in an increased area fraction of tempered martensite formed in a reheating step described later and a retained austenite volume fraction in a desired range. Furthermore, transformation of part of austenite to martensite at the time of cooling stop can decrease the amount of diffusible hydrogen in the steel sheet, consequently decrease the number of voids after blanking, and improve the stretch-flangeability. At a cooling stop temperature of less than 150° C., untransformed austenite present while cooling is almost entirely transformed into martensite at the time of cooling stop, and therefore the retained austenite volume fraction cannot be in a desired range, and the ductility is reduced. On the other hand, a cooling stop temperature of more than 300° C. results in an increased martensite area fraction and may result in a decreased YS. Furthermore, as the martensite area fraction increases, the amount of diffusible hydrogen in the steel sheet also increases, and this decreases the number of voids after blanking and reduces the stretch-flangeability (hole expandability). Thus, the cooling stop temperature ranges from 150° C. to 300° C. The cooling stop temperature is preferably 170° C. or more, more preferably 180° C. or more. The cooling stop temperature is preferably 270° C. or less, more preferably 240° C. or less. The average cooling rate from 550° C. to the cooling stop temperature in the cooling is preferably, but is not limited to, typically 1° C./s to 50° C./s.

Number of times of bending and unbending using roller with radius in the range of 100 to 1000 mm while cooling from 740° C. to cooling stop temperature: 3 to 15 times in total While cooling from 740° C. to the cooling stop temperature after the second annealing, bending and unbending are performed 3 to 15 times in total using a roller with a radius in the range of 100 to 1000 mm. The bending and unbending 3 or more times in total introduce a bending strain near the surface of the steel sheet and enable the formation of a region 1.0 μm or more in thickness with a Si concentration not more than one-third of the Si concentration in the chemical composition of the steel sheet and with a Mn concentration not more than one-third of the Mn concentration in the chemical composition of the steel sheet in the region within 4.9 μm in the thickness direction from the surface of the steel sheet. The bending and unbending 3 or more times in total introduce a bending strain near the surface of the steel sheet and enable the formation of a region 1.0 μm or more in thickness with a Si concentration not more than one-third of the Si concentration in the chemical composition of the steel sheet and with a Mn concentration not more than one-third of the Mn concentration in the chemical composition of the steel sheet in the region within 15.0 μm in the thickness direction from the surface of the steel sheet.

When the bending and unbending are performed 3 or more times in total, the lowest Si concentration $L_{Si}$ and the lowest Mn concentration $L_{Mn}$ in the region within 4.9 μm in the thickness direction from the surface of the steel sheet and a Si concentration $T_{Si}$ and a Mn concentration $T_{Mn}$ at a quarter thickness position of the steel sheet can satisfy $L_{Si}+L_{Mn} \leq (T_{Si}+T_{Mn})/4$. Furthermore, this facilitates the control of the average grain size of crystal grains containing an oxide of Si and/or Mn in a desired range in the region within 4.9 μm in the thickness direction from the surface of the steel sheet. When the bending and unbending are performed 3 or more times in total, the lowest Si concentration $L_{Si}$ and the lowest Mn concentration $L_{Mn}$ in the region within 15.0 μm in the thickness direction from the surface of the steel sheet and a Si concentration $T_{Si}$ and a Mn concentration $T_{Mn}$ at a quarter thickness position of the steel sheet can satisfy $L_{Si}+L_{Mn} \leq (T_{Si}+T_{Mn})/4$. Furthermore, this facilitates the control of the average grain size of crystal grains containing an oxide of Si and/or Mn in a desired range in the region within 15.0 μm in the thickness direction from the surface of the steel sheet.

These can achieve high delayed fracture resistance and LME resistance. On the other hand, these effects are saturated when the bending and unbending are performed more than 15 times in total. Thus, the total number of bending and unbending is 15 times or less. To produce the effect, an appropriate bending strain must be introduced around the surface of a steel sheet using a roller with a radius of 1000 μm or less. A roller with a radius of less than 100 μm, however, introduces a too large bending strain and cannot produce the effects. Thus, a roller with a radius in the range of 100 to 1000 mm was used.

The phrase "bending and unbending" in disclosed embodiments is not the number of bending and unbending cycles but the sum of the number of times of bending and the number of times of unbending.

Reheating Temperature: (Cooling Stop Temperature +50° C.) to 500° C.

After the bending and unbending, the cold-rolled steel sheet is reheated to the temperature range of (the cooling stop temperature +50° C.) to 500° C. and is held in this temperature range for 10 seconds or more. The cooling stop temperature, as used herein, refers to the cooling stop temperature after the second annealing. At a reheating temperature of (the cooling stop temperature +50° C.) or more, martensite present at the time of cooling stop is tempered, and C supersaturated in the martensite is diffused into austenite. Thus, austenite stable at room temperature, that is, retained austenite, can be formed. At a reheating temperature of less than (the cooling stop temperature +50° C.), carbon is not distributed from martensite formed at the time of cooling stop to untransformed austenite, and therefore the retained austenite volume fraction cannot be in a desired range, and the ductility is reduced. Furthermore, as the quenched martensite area fraction increases, the amount of diffusible hydrogen in the steel sheet also increases, and this decreases the number of voids after blanking and reduces the stretch-flangeability (hole expandability). On the other hand, a reheating temperature of more than 500° C. results in excessive tempering of martensite formed at the time of cooling stop and therefore difficulty in achieving a TS of 1180 MPa or more. Furthermore, untransformed austenite present at the time of cooling stop is decomposed as carbide (pearlite), and the ductility is reduced. Thus, the reheating temperature ranges from (the cooling stop temperature +50° C.) to 500° C. The reheating temperature is preferably (the cooling stop temperature +80° C.) or more, more preferably (the cooling stop temperature +100° C.) or more. The reheating temperature (in the second annealing) is preferably 450° C. or less.

Holding Time at Reheating Temperature: 10 Seconds or More

Holding at the reheating temperature can distribute carbon from martensite formed at the time of cooling stop to untransformed austenite and achieve the retained austenite volume fraction in a desired range. When the holding time at the reheating temperature is less than 10 seconds, carbon is not distributed from martensite formed at the time of cooling stop to untransformed austenite, and therefore the retained austenite volume fraction cannot be in a desired range, and the ductility is reduced. Furthermore, this increases the martensite area fraction, decreases the YS, and decreases dimensional accuracy at the time of forming. Furthermore, as the martensite area fraction increases, the amount of diffusible hydrogen in the steel sheet also increases, and this decreases the number of voids after blanking and reduces the stretch-flangeability (hole expandability). Thus, the holding time at the reheating temperature is 10 seconds or more. The upper limit of the holding time at the reheating temperature is preferably, but is not limited to, 1000 seconds or less due to limited production technology. The holding time at the reheating temperature is preferably 13 seconds or more and preferably 300 seconds or less.

The average cooling rate, the cooling stop temperature, and the cooling method after holding at the reheating temperature are not particularly limited. The cooling method may be gas jet cooling, mist cooling, roll cooling, water cooling, air cooling, or the like. To prevent oxidation of the surface of a steel sheet, after holding at the reheating temperature, the steel sheet is preferably cooled to 50° C. or less, more preferably approximately room temperature. The average cooling rate of the cooling typically ranges from 1° C./s to 50° C./s.

In a method for producing a steel sheet according to the disclosed embodiments, a steel sheet produced through these production steps may be subjected to temper rolling. A rolling reduction of temper rolling above 1.50% increases the yield stress of the steel and decreases the dimensional accuracy at the time of forming. Thus, the rolling reduction is preferably 1.50% or less. The lower limit of the rolling reduction in the temper rolling is preferably, but is not limited to, 0.05% or more in terms of productivity. The temper rolling may be performed with an apparatus coupled to an annealing apparatus for the annealing step (on-line) or with an apparatus separated from the annealing apparatus for the annealing step (off-line). Rolling may be performed once to achieve the desired rolling reduction or multiple times to achieve a total rolling reduction in the range of 0.05% to 1.50%. The rolling described herein typically refers to temper rolling but may be rolling with a leveler or the like that can achieve an elongation percentage equivalent to that of temper rolling.

A method for producing a steel sheet according to the disclosed embodiments preferably includes a plating step of performing hot-dip galvanizing on a steel sheet produced through the production steps described above or performing the hot-dip galvanizing followed by reheating to the temperature range of 450° C. to 600° C. and performing alloying treatment. In the treatment of performing hot-dip galvanizing on a steel sheet, annealing and hot-dip galvanizing treatment may be performed with an apparatus configured to continuously perform annealing and hot-dip galvanizing treatment. To perform hot-dip galvanizing on a steel sheet, preferably, the steel sheet is immersed in a galvanizing bath in the temperature range of 440° C. to 500° C. to perform hot-dip galvanizing treatment, and then the coating weight is adjusted by gas wiping or the like. For the hot-dip galvanizing, it is preferable to use a galvanizing bath having a composition with an Al content in the range of 0.10% to 0.23% by mass and the remainder composed of Zn and incidental impurities. To perform hot-dip galvannealing on a steel sheet, the steel sheet is preferably subjected to hot-dip galvanizing treatment and then alloying treatment in the temperature range of 450° C. to 600° C. An alloying temperature of less than 450° C. may result in an excessively low Zn—Fe alloying rate and make alloying very difficult. On the other hand, an alloying temperature of more than 600° C. may result in transformation of untransformed austenite into pearlite and lower TS and ductility. Thus, to perform galvannealing treatment, alloying treatment is preferably performed in the temperature range of 450° C. to 600° C., more preferably 470° C. or more, and more preferably 550° C. or less, still more preferably 530° C. or less.

Furthermore, the coating weight of a hot-dip galvanized steel sheet (GI) and a hot-dip galvannealed steel sheet (GA) preferably ranges from 20 to 80 g/m$^2$ per side (plating on both sides). The coating weight can be adjusted by gas wiping or the like after galvanization.

A steel sheet plated as described above may be cooled to 50° C. or less and then rolled at an elongation percentage in the range of 0.05% to 1.00%. The elongation percentage of the rolling after cooling to 50° C. or less is more preferably 0.10% or more, more preferably 0.70% or less.

The rolling after cooling to 50° C. or less may be performed with an apparatus coupled to a plating apparatus for the galvanizing treatment (on-line) or with an apparatus separated from the plating apparatus for the galvanizing treatment (off-line). Rolling may be performed once to achieve the desired elongation percentage or multiple times to achieve a total elongation percentage in the range of 0.05% to 1.00%. The rolling described herein typically refers to temper rolling but may be rolling by a method such as processing with a leveler that can achieve an elongation percentage equivalent to that of temper rolling.

A method for producing a steel sheet according to the disclosed embodiments preferably includes a dehydrogenation step of holding the steel sheet in the temperature range of 50° C. to 300° C. for 0.5 to 72.0 hours after the reheating step. When hot-dip galvanizing or hot-dip galvannealing is performed on a steel sheet, the plating step is preferably followed by the dehydrogenation step. The dehydrogenation step can further decrease the amount of diffusible hydrogen in a steel sheet, consequently decrease the number of voids after blanking, and further improve the stretch-flangeability (hole expandability). Holding in the temperature range of more than 300° C. or holding for more than 72.0 hours may make it difficult to achieve a desired TS by tempering. Furthermore, holding at less than 50° C. or holding for less than 0.5 hours may have an insufficient effect of decreasing the amount of diffusible hydrogen in a steel sheet. Thus, in the dehydrogenation step, a steel sheet after the plating step is preferably held in the temperature range of 50° C. to 300° C. for 0.5 to 72.0 hours. Furthermore, in the dehydrogenation step, a steel sheet after the plating step is more preferably held in the temperature range of room temperature to 70° C. or more. Furthermore, holding at 200° C. or less in the temperature range of 200° C. or less is more preferred. Furthermore, the holding time is more preferably one hour or more. Furthermore, the holding time is more preferably 36.0 hours or less.

Production conditions other than those described above may be usual conditions.

Second Embodiment

Next, a second embodiment of a method for producing a steel sheet according to the disclosed embodiments is described below. The second embodiment of a method for producing a steel sheet according to the disclosed embodiments includes a hot-rolling step of hot-rolling a steel slab with the chemical composition described above followed by coiling at a coiling temperature in the range of 450° C. to 750° C., a cold-rolling step of holding the steel sheet after the hot-rolling step in the temperature range of 400° C. or more for 3600 seconds or more, pickling the steel sheet, and cold-rolling the steel sheet at a rolling reduction of 30% or more, a first annealing step of holding the steel sheet after the cold-rolling step in the temperature range of 820° C. or more for 20 seconds or more, a second annealing step of holding the steel sheet after the first annealing step in an atmosphere with a dew-point temperature of −35° C. or more in the temperature range of 740° C. to 900° C. for 20 seconds or more, cooling the steel sheet, at an average cooling rate of 8° C./s or more from this temperature range to 550° C., to a cooling stop temperature in the range of 350° C. to 500° C., and bending and unbending the steel sheet 3 to 15 times in total using a roller with a radius in the range of 100 to 1000 mm during the cooling from 740° C. to the cooling stop temperature, a plating step of performing hot-dip galvanizing on the steel sheet after the second annealing step or performing the hot-dip galvanizing followed by reheating to the temperature range of 450° C. to 600° C. and performing alloying treatment, and a reheating step of cooling the steel sheet after the plating step to a cooling stop temperature in the range of 50° C. to 350° C., reheating the steel sheet to a temperature exceeding the cooling stop temperature and in the range of 300° C. to 500° C., and holding the temperature for 10 seconds or more. Like the first embodiment, the second embodiment preferably includes a dehydrogenation step of holding the steel sheet in the temperature range of 50° C. to 300° C. for 0.5 to 72.0 hours after the reheating step.

In the description of the second embodiment, only the conditions different from those of the first embodiment are described.

Cooling Stop Temperature after Second Annealing: 350° C. to 500° C.

In the second embodiment, the second annealing step includes holding the steel sheet after the first annealing step in an atmosphere with a dew-point temperature of −35° C. or more in the temperature range of 740° C. to 900° C. for 20 seconds or more, cooling the steel sheet, at an average cooling rate of 8° C./s or more from this temperature range to 550° C., to a cooling stop temperature in the range of 350° C. to 500° C., and bending and unbending the steel sheet 3 to 15 times in total using a roller with a radius in the range of 100 to 1000 mm during the cooling from 740° C. to the cooling stop temperature. In the second embodiment, unlike the first embodiment, the second annealing is followed by cooling to a cooling stop temperature in the range of 350° C. to 500° C. In the second embodiment, to reduce the transformation of the microstructure before the plating step, the cooling stop temperature is 350° C. or more. To reduce the formation of pearlite, the cooling stop temperature is 500° C. or less.

Cooling Stop Temperature when a Steel Sheet is Cooled after the Plating Step: 50° C. to 350° C.

The second embodiment includes the plating step after the second annealing step, and the reheating step of cooling the steel sheet after the plating step to a cooling stop temperature in the range of 50° C. to 350° C., reheating the steel sheet to a temperature exceeding the cooling stop temperature and in the range of 300° C. to 500° C., and holding the temperature for 10 seconds or more. In the reheating step, as described above, the plating step is followed by cooling the steel sheet to a cooling stop temperature in the range of 50° C. to 350° C. A cooling stop temperature equal to or lower than the martensite transformation start temperature can result in an increased area fraction of tempered martensite formed in a holding step after the reheating described later and a retained austenite volume fraction in a desired range. Furthermore, transformation of part of austenite to martensite at the time of cooling stop can decrease the amount of diffusible hydrogen in the steel sheet, consequently decrease the number of voids after blanking, and improve the stretch-flangeability. At a cooling stop temperature of less than 50° C., untransformed austenite present while cooling is almost entirely transformed into martensite at the time of cooling stop, and therefore the retained austenite volume fraction cannot be in a desired range, and the ductility is reduced. On the other hand, a cooling stop temperature of more than 350° C. results in an increased martensite area fraction and a decreased YS. Furthermore, as the martensite area fraction increases, the amount of diffusible hydrogen in the steel sheet also increases, and this decreases the number of voids after blanking and reduces the stretch-flangeability (hole expandability). Thus, the cooling stop temperature ranges from 50° C. to 350° C. The cooling stop temperature is preferably 100° C. or more, more preferably 170° C. or more. The cooling stop temperature is preferably 300° C. or less, more preferably 270° C. or less.

Reheating Temperature: Higher than Cooling Stop Temperature and in the Range of 300° C. to 500° C., Reheating Time: 10 Seconds or More Holding at a reheating temperature exceeding the cooling stop temperature and in the range of 300° C. to 500° C. can distribute carbon from martensite formed at the time of cooling stop to untransformed austenite and achieve the retained austenite volume fraction in a desired range. The term "cooling stop temperature", as used herein, refers to a cooling stop temperature of a steel sheet cooled before reheating. When the holding time at the reheating temperature is less than 10 seconds, carbon is not distributed from martensite formed at the time of cooling stop to untransformed austenite, and therefore the retained austenite volume fraction cannot be in a desired range, and the ductility is reduced. Furthermore, this increases the martensite area fraction, decreases the YS, and decreases dimensional accuracy at the time of forming. Furthermore, as the martensite area fraction increases, the amount of diffusible hydrogen in the steel sheet also increases, and this decreases the number of voids after blanking and reduces the stretch-flangeability (hole expandability). Thus, the holding time at the second reheating temperature is 10 seconds or more. The upper limit of the holding time at the second reheating temperature is preferably, but is not limited to, 1000 seconds or less due to limited production technology. The holding time at the second reheating temperature is preferably 13 seconds or more, and 300 seconds or less.

The average cooling rate, the cooling stop temperature, and the cooling method after holding at the reheating temperature are not particularly limited. The cooling method may be gas jet cooling, mist cooling, roll cooling, water cooling, air cooling, or the like. To prevent oxidation of the surface of a steel sheet, after holding at a first reheating temperature, the steel sheet is preferably cooled to 50° C. or less, more preferably approximately room temperature. The average cooling rate of the cooling typically ranges from 1° C./s to 50° C./s.

In a series of heat treatment in a production method according to the disclosed embodiments described above, the holding temperature may vary in the temperature range described above. The cooling rate while cooling may also vary in a specified range without departing from the gist of the disclosed embodiments. A steel sheet may be heat-treated in any facility provided that the thermal history is satisfied.

Next, a member according to the disclosed embodiments and a method for producing the member are described below.

A member according to the disclosed embodiments is produced by performing at least one of forming and welding on a steel sheet according to the disclosed embodiments. A method for producing a member according to the disclosed embodiments includes the step of performing at least one of forming and welding on a steel sheet produced by a method for producing a steel sheet according to the disclosed embodiments.

A steel sheet according to the disclosed embodiments has a tensile strength (TS) of 1180 MPa or more, a high yield stress (YS), high ductility, high stretch-flangeability (hole expandability), high delayed fracture resistance, and high LME resistance. Thus, a member produced by using a steel sheet according to the disclosed embodiments can be suitably used for, for example, a structural member exemplified by a center pillar.

The forming may be any typical processing method, such as press forming. The welding may be any typical welding, such as spot welding or arc welding.

EXAMPLES

Example 1

The disclosed embodiments are more specifically described with reference to examples. The scope of the disclosed embodiments is not limited to the following examples.

A steel material with the chemical composition listed in Table 1 and with the remainder composed of Fe and incidental impurities was obtained by steelmaking in a converter and was formed into a steel slab in a continuous casting method. The steel slab was heated to 1250° C. and was subjected to rough rolling. The steel was then subjected to finish rolling at a finish rolling temperature of 900° C. and was coiled at different coiling temperatures listed in Table 2 as a hot-rolled steel sheet.

Under the conditions shown in Table 2, a cold-rolling step, a first annealing step, and a second annealing step were then performed to produce a cold-rolled steel sheet (CR).

As described below, a steel sheet was then produced through the production process according to a first embodiment or a second embodiment.

In the first embodiment, the second annealing step was followed by reheating treatment under the conditions shown in Table 2. Some of the steel sheets were then subjected to plating treatment under the conditions shown in Table 2. Some of the steel sheets were then subjected to dehydrogenation under the conditions shown in Table 2 to produce steel sheets.

In the second embodiment, the second annealing step was followed by a plating step under the conditions shown in Table 2. A reheating step was then performed under the conditions shown in Table 2 to produce a steel sheet.

In a working example of the first embodiment, the cooling stop temperature after annealing in the second annealing step ranges from 150° C. to 300° C., as shown in Table 2. In a working example of the second embodiment, the cooling stop temperature after annealing in the second annealing step ranges from 350° C. to 500° C.

In the plating step, a cold-rolled steel sheet was subjected to plating treatment to produce a hot-dip galvanized steel sheet (GI) or a hot-dip galvannealed steel sheet (GA). To produce GI, the hot-dip galvanizing bath was a zinc bath containing Al: 0.20% by mass and the remainder composed of Zn and incidental impurities. To produce GA, a zinc bath containing Al: 0.14% by mass and the remainder composed of Zn and incidental impurities was used. The bath temperature was 470° C. for both GI and GA production. The coating weight ranged from approximately 45 to 72 g/m² per side (plating on both sides) to produce GI and was approximately 45 g/m² per side (plating on both sides) to produce GA. Alloying treatment to produce GA was performed at the temperatures shown in Table 2. The composition of the coated layer of GI contained Fe: 0.1% to 1.0% by mass, Al: 0.2% to 1.0% by mass, and the remainder composed of Zn and incidental impurities. The composition of the coated layer of GA contained Fe: 7% to 15% by mass, Al: 0.1% to 1.0% by mass, and the remainder composed of Zn and incidental impurities.

TABLE 1

| Steel type | Chemical composition (mass %) | | | | | | | | | | Ceq (%) |
|---|---|---|---|---|---|---|---|---|---|---|---|
| | C | Si | Mn | P | S | Al | N | Sb | Sn | Others | |
| A | 0.212 | 1.12 | 2.99 | 0.008 | 0.0012 | 0.035 | 0.0035 | — | — | — | 0.757 |
| B | 0.194 | 0.89 | 2.83 | 0.019 | 0.0021 | 0.031 | 0.0029 | — | — | — | 0.703 |
| C | 0.179 | 1.83 | 2.78 | 0.031 | 0.0008 | 0.052 | 0.0032 | 0.0080 | — | — | 0.719 |
| D | 0.182 | 1.54 | 2.85 | 0.010 | 0.0009 | 0.037 | 0.0041 | — | 0.0060 | — | 0.721 |
| E | 0.188 | 1.50 | 2.89 | 0.008 | 0.0018 | 0.031 | 0.0030 | — | — | — | 0.732 |
| F | 0.169 | 0.91 | 3.41 | 0.009 | 0.0027 | 0.045 | 0.0028 | — | — | — | 0.775 |
| G | 0.203 | 1.45 | 3.14 | 0.009 | 0.0028 | 0.025 | 0.0041 | 0.0110 | — | — | 0.787 |
| H | 0.218 | 0.83 | 3.21 | 0.015 | 0.0015 | 0.032 | 0.0034 | — | 0.0120 | — | 0.788 |
| I | 0.310 | 1.67 | 3.04 | 0.012 | 0.0007 | 0.042 | 0.0022 | 0.0060 | 0.0040 | — | 0.886 |
| J | 0.295 | 0.95 | 2.85 | 0.021 | 0.0009 | 0.635 | 0.0033 | — | — | — | 0.810 |
| M | 0.212 | 0.03 | 2.89 | 0.011 | 0.0012 | 0.040 | 0.0035 | — | — | — | 0.695 |
| N | 0.186 | 2.75 | 2.83 | 0.015 | 0.0015 | 0.034 | 0.0044 | — | — | — | 0.772 |
| O | 0.210 | 1.45 | 4.53 | 0.022 | 0.0025 | 0.026 | 0.0038 | — | — | — | 1.025 |
| Q | 0.179 | 1.65 | 2.78 | 0.008 | 0.0007 | 0.034 | 0.0038 | — | — | Ti: 0.024 | 0.711 |
| S | 0.205 | 1.79 | 3.02 | 0.013 | 0.0030 | 0.044 | 0.0022 | — | — | Nb: 0.041 | 0.783 |
| T | 0.172 | 1.52 | 3.10 | 0.019 | 0.0034 | 0.033 | 0.0052 | 0.0100 | — | V: 0.050 | 0.756 |
| U | 0.200 | 1.74 | 2.92 | 0.023 | 0.0025 | 0.025 | 0.0026 | — | — | Ti: 0.015, B: 0.0016 | 0.759 |
| V | 0.180 | 1.32 | 2.78 | 0.017 | 0.0041 | 0.032 | 0.0025 | — | 0.0090 | Cu: 0.340 | 0.698 |
| W | 0.185 | 1.39 | 2.99 | 0.020 | 0.0012 | 0.034 | 0.0046 | 0.0090 | — | Cr: 0.406 | 0.822 |
| X | 0.128 | 1.95 | 3.72 | 0.013 | 0.0021 | 0.050 | 0.0032 | — | — | Ni: 0.615 | 0.845 |
| Y | 0.182 | 1.22 | 3.12 | 0.008 | 0.0008 | 0.034 | 0.0017 | — | — | Mo: 0.300 | 0.828 |
| Z | 0.322 | 0.59 | 2.72 | 0.013 | 0.0026 | 0.045 | 0.0022 | 0.0060 | — | W: 0.010 | 0.800 |
| AA | 0.149 | 1.03 | 3.11 | 0.006 | 0.0018 | 0.038 | 0.0056 | — | — | Ta: 0.007 | 0.710 |
| AB | 0.185 | 1.28 | 3.22 | 0.012 | 0.0060 | 0.025 | 0.0029 | — | — | Pb: 0.0050 | 0.775 |
| AC | 0.179 | 0.84 | 3.14 | 0.014 | 0.0020 | 0.034 | 0.0023 | — | 0.0050 | Bi: 0.0030 | 0.737 |
| AD | 0.235 | 1.36 | 2.91 | 0.019 | 0.0024 | 0.034 | 0.0046 | — | — | Se: 0.0090 | 0.777 |
| AE | 0.169 | 1.66 | 3.23 | 0.019 | 0.0031 | 0.054 | 0.0045 | 0.0270 | — | Te: 0.0130 | 0.777 |
| AF | 0.195 | 0.82 | 2.82 | 0.031 | 0.0009 | 0.030 | 0.0041 | — | 0.0030 | Ge: 0.0100 | 0.699 |
| AG | 0.162 | 1.29 | 3.14 | 0.010 | 0.0022 | 0.034 | 0.0026 | — | — | As: 0.0130 | 0.739 |
| AH | 0.190 | 1.37 | 3.05 | 0.008 | 0.0009 | 0.048 | 0.0068 | 0.0080 | 0.0060 | Sr: 0.0070 | 0.755 |
| AI | 0.155 | 1.68 | 2.95 | 0.037 | 0.0021 | 0.022 | 0.0034 | — | 0.0250 | Cs: 0.0090 | 0.717 |
| AJ | 0.175 | 1.63 | 2.78 | 0.012 | 0.0035 | 0.040 | 0.0036 | — | — | Zn: 0.004 | 0.706 |
| AK | 0.225 | 1.69 | 3.12 | 0.045 | 0.0012 | 0.045 | 0.0028 | 0.0060 | 0.0040 | Co: 0.007 | 0.815 |
| AL | 0.172 | 1.22 | 3.04 | 0.014 | 0.0024 | 0.035 | 0.0032 | — | — | Ca: 0.0035 | 0.730 |
| AM | 0.236 | 1.76 | 2.88 | 0.015 | 0.0007 | 0.024 | 0.0038 | — | 0.0080 | Ce: 0.0015 | 0.789 |
| AN | 0.139 | 1.52 | 2.99 | 0.033 | 0.0006 | 0.031 | 0.0044 | 0.0040 | — | Mg: 0.0030 | 0.701 |
| AO | 0.175 | 1.20 | 3.22 | 0.015 | 0.0022 | 0.036 | 0.0032 | 0.0070 | — | Zr: 0.0050 | 0.762 |
| AP | 0.169 | 1.13 | 2.92 | 0.009 | 0.0028 | 0.016 | 0.0028 | — | — | Hf: 0.0040 | 0.703 |
| AQ | 0.235 | 1.60 | 3.12 | 0.007 | 0.0012 | 0.035 | 0.0040 | 0.0100 | 0.0030 | REM: 0.0020 | 0.822 |
| AS | 0.201 | 0.89 | 2.95 | 0.010 | 0.0012 | 0.030 | 0.0025 | — | — | Ti: 0.022, B: 0.0014 | 0.730 |
| AT | 0.218 | 0.85 | 2.89 | 0.012 | 0.0009 | 0.028 | 0.0032 | 0.0080 | — | Ti: 0.019, B: 0.0018 | 0.735 |
| AU | 0.223 | 1.05 | 3.21 | 0.008 | 0.0008 | 0.026 | 0.0039 | 0.0100 | — | — | 0.802 |
| AV | 0.188 | 1.34 | 2.89 | 0.010 | 0.0012 | 0.040 | 0.0038 | — | — | Ti: 0.018, Nb: 0.021 | 0.726 |
| AW | 0.202 | 1.08 | 3.01 | 0.009 | 0.0014 | 0.032 | 0.0032 | — | — | Cr: 0.091, Ca: 0.0020 | 0.749 |
| AX | 0.195 | 0.88 | 3.21 | 0.010 | 0.0009 | 0.036 | 0.0036 | 0.0070 | — | Nb: 0.025, Zr: 0.0020 | 0.767 |

"—" indicates the content of the inevitable impurity level.

TABLE 2-1

| | | Hot-rolling step | Cold-rolling step | | First annealing step | | Second annealing step | | | | |
|---|---|---|---|---|---|---|---|---|---|---|---|
| No. | Steel type | Coiling temperature (° C.) | Holding time at 400° C. or more (seconds) | Rolling reduction (%) | Annealing temperature (° C.) | Holding time (seconds) | Annealing temperature (° C.) | Holding time (seconds) | Dew-point temperature (° C.) | Average cooling rate up to 550° C. (° C./s) | Cooling stop temperature (° C.) |
| 1 | A | 560 | 6600 | 64.7 | 840 | 180 | 820 | 200 | −3 | 10 | 210 |
| 2 | B | 500 | 7000 | 61.9 | 850 | 120 | 800 | 150 | −4 | 12 | 480 |
| 3 | C | 490 | 5400 | 66.7 | 860 | 200 | 790 | 180 | −5 | 14 | 400 |
| 4 | D | 580 | 8000 | 72.2 | 900 | 300 | 800 | 150 | −2 | 13 | 200 |
| 5 | E | 600 | 6200 | 64.7 | 880 | 150 | 810 | 300 | −8 | 15 | 160 |
| 6 | E | 320 | 8200 | 65.0 | 850 | 250 | 800 | 240 | −12 | 10 | 220 |
| 7 | E | 580 | 800 | 61.1 | 880 | 400 | 790 | 210 | −7 | 11 | 180 |
| 9 | E | 550 | 8000 | 55.6 | 680 | 250 | 790 | 160 | −13 | 13 | 200 |
| 10 | E | 630 | 7800 | 66.7 | 870 | 5 | 810 | 210 | −15 | 10 | 420 |
| 11 | E | 500 | 6000 | 60.0 | 840 | 220 | 660 | 200 | −2 | 16 | 450 |
| 12 | E | 600 | 9000 | 57.9 | 850 | 180 | 940 | 150 | −10 | 18 | 190 |
| 13 | E | 620 | 6800 | 57.1 | 830 | 300 | 800 | 5 | −9 | 12 | 200 |
| 14 | E | 540 | 7200 | 55.6 | 820 | 180 | 800 | 300 | −45 | 11 | 400 |
| 15 | E | 590 | 7800 | 50.0 | 890 | 200 | 810 | 150 | −9 | 4 | 380 |
| 16 | E | 530 | 6800 | 58.8 | 860 | 160 | 800 | 90 | −10 | 12 | 60 |

TABLE 2-1-continued

| 17 | E | 580 | 7200 | 66.7 | 880 | 230 | 800 | 120 | −12 | 16 | 480 |
| 18 | E | 480 | 6700 | 58.8 | 870 | 180 | 780 | 150 | −10 | 14 | 480 |
| 19 | E | 530 | 5800 | 66.7 | 850 | 220 | 800 | 280 | −4 | 11 | 170 |
| 20 | E | 550 | 6200 | 64.7 | 870 | 260 | 790 | 150 | −6 | 18 | 240 |
| 22 | E | 630 | 7200 | 50.0 | 840 | 180 | 800 | 270 | −9 | 12 | 450 |
| 24 | E | 550 | 7200 | 52.9 | 870 | 90 | 800 | 210 | −5 | 10 | 420 |
| 25 | E | 580 | 6000 | 43.8 | 880 | 200 | 790 | 200 | −7 | 17 | 490 |
| 26 | F | 540 | 8300 | 63.2 | 890 | 80 | 800 | 80 | −10 | 13 | 200 |
| 27 | G | 560 | 4600 | 52.9 | 850 | 180 | 810 | 300 | −4 | 15 | 480 |
| 28 | H | 600 | 7600 | 62.5 | 830 | 200 | 820 | 200 | −9 | 10 | 490 |
| 29 | I | 470 | 6000 | 58.8 | 900 | 140 | 790 | 150 | −12 | 11 | 220 |
| 30 | J | 620 | 8000 | 64.7 | 880 | 90 | 800 | 180 | −6 | 14 | 190 |
| 33 | M | 620 | 7400 | 58.8 | 860 | 150 | 820 | 200 | −4 | 15 | 400 |
| 34 | N | 560 | 5400 | 46.2 | 880 | 230 | 810 | 300 | −6 | 11 | 390 |
| 35 | O | 530 | 5800 | 60.0 | 840 | 190 | 800 | 90 | −8 | 15 | 450 |
| 37 | Q | 600 | 10500 | 61.1 | 900 | 210 | 820 | 150 | −18 | 15 | 180 |
| 38 | S | 580 | 8000 | 58.8 | 860 | 180 | 830 | 120 | −1 | 11 | 200 |
| 39 | T | 570 | 7500 | 50.0 | 840 | 200 | 850 | 180 | −22 | 10 | 210 |
| 40 | U | 620 | 10000 | 45.2 | 880 | 140 | 770 | 200 | −7 | 18 | 180 |
| 41 | V | 630 | 9000 | 50.0 | 870 | 100 | 840 | 60 | −26 | 28 | 200 |

| | Second annealing step Bending and unbending | | Reheating step (first embodiment) | | Plating step | | Dehydrogenation step | | Reheating step (second embodiment) Cooling | | |
|---|---|---|---|---|---|---|---|---|---|---|---|
| No. | Roller radius (mm) | Count (times) | Reheating temperature (°C) | Holding time (seconds) | Type* | Alloying temperature (°C) | Processing temperature (°C) | Holding time (h) | stop temperature (°C) | Reheating temperature (°C) | Holding time (seconds) |
| 1 | 400 | 10 | 400 | 50 | GA | 500 | 90 | 8 | | | |
| 2 | 600 | 7 | | | GI | | | | 190 | 390 | 70 |
| 3 | 450 | 8 | | | GA | 490 | | | 170 | 430 | 120 |
| 4 | 550 | 9 | | | CR | | | | | | |
| 5 | 500 | 11 | 350 | 150 | GA | 510 | 80 | 20 | | | |
| 6 | 500 | 9 | 400 | 200 | GA | 490 | 100 | 7 | | | |
| 7 | 650 | 10 | 410 | 90 | GA | 510 | | | | | |
| 9 | 450 | 11 | 390 | 380 | GA | 530 | 90 | 34 | | | |
| 10 | 550 | 9 | | | GI | | | | 220 | 350 | 60 |
| 11 | 600 | 8 | | | GA | 540 | | | 190 | 400 | 120 |
| 12 | 400 | 7 | 400 | 120 | GA | 520 | 110 | 7 | | | |
| 13 | 350 | 12 | 420 | 500 | GA | 500 | 80 | 25 | | | |
| 14 | 700 | 11 | | | GA | 510 | | | 200 | 410 | 150 |
| 15 | 500 | 14 | | | GA | 490 | | | 190 | 420 | 200 |
| 16 | 450 | 9 | 390 | 250 | GA | 500 | 80 | 35 | | | |
| 17 | 650 | 5 | 400 | 100 | GA | 510 | | | | | |
| 18 | 500 | 1 | | | GA | 500 | | | 190 | 350 | 100 |
| 19 | 550 | 7 | 560 | 90 | GA | 490 | 100 | 12 | | | |
| 20 | 400 | 14 | 390 | 4 | GA | 530 | 150 | 5 | | | |
| 22 | 500 | 9 | | | GA | 520 | | | 20 | 390 | 80 |
| 24 | 550 | 6 | | | GA | 500 | | | 200 | 550 | 80 |
| 25 | 400 | 8 | | | GA | 510 | | | 150 | 400 | 3 |
| 26 | 450 | 11 | 380 | 300 | GA | 500 | 200 | 3 | | | |
| 27 | 600 | 7 | | | GA | 510 | | | 220 | 390 | 50 |
| 28 | 550 | 6 | | | GI | | | | 190 | 420 | 140 |
| 29 | 650 | 13 | 400 | 500 | GR | | | | | | |
| 30 | 450 | 10 | 380 | 150 | GA | 490 | | | | | |
| 33 | 500 | 9 | | | GA | 520 | | | 200 | 410 | 80 |
| 34 | 450 | 12 | | | GA | 500 | | | 180 | 420 | 120 |
| 35 | 600 | 11 | | | GI | | | | 220 | 360 | 200 |
| 37 | 500 | 6 | 410 | 90 | GI | | 100 | 20 | | | |
| 38 | 550 | 8 | 420 | 120 | GA | 520 | 130 | 10 | | | |
| 39 | 500 | 12 | 390 | 650 | CR | | | | | | |
| 40 | 650 | 10 | 430 | 70 | GA | 480 | | | | | |
| 41 | 700 | 8 | 410 | 120 | GA | 530 | 150 | 8 | | | |

*CR: cold-rolled steel sheet (without plating),
GI: hot-dip galvanized steel sheet,
GA: hot-dip galvannealed steel sheet

TABLE 2-2

| | | Hot-rolling step | Cold-rolling step | | First annealing step | | Second annealing step | | | | |
|---|---|---|---|---|---|---|---|---|---|---|---|
| | | | Holding time at | | | | | | | Average cooling | Cooling |
| No. | Steel type | Coiling temperature (°C.) | 400° C. or more (seconds) | Rolling reduction (%) | Annealing temperature (°C.) | Holding time (seconds) | Annealing temperature (°C.) | Holding time (seconds) | Dew-point temperature (°C.) | rate up to 550° C. (°C./s) | stop temperature (°C.) |
| 42 | W | 540 | 7400 | 53.8 | 910 | 140 | 800 | 200 | −8 | 9 | 190 |
| 43 | X | 520 | 5900 | 58.8 | 870 | 600 | 790 | 300 | −9 | 22 | 400 |
| 44 | Y | 560 | 8800 | 62.5 | 880 | 300 | 830 | 380 | −12 | 24 | 480 |
| 45 | Z | 590 | 8000 | 71.4 | 850 | 240 | 800 | 200 | −3 | 16 | 280 |
| 46 | AA | 720 | 11000 | 50.0 | 840 | 350 | 790 | 250 | −9 | 12 | 200 |
| 47 | AB | 560 | 7200 | 61.5 | 860 | 200 | 780 | 150 | −15 | 13 | 460 |
| 48 | AC | 560 | 9000 | 52.9 | 840 | 140 | 810 | 220 | −12 | 45 | 420 |
| 49 | AD | 610 | 5300 | 43.8 | 850 | 230 | 830 | 130 | −4 | 12 | 200 |
| 50 | AE | 560 | 7000 | 55.6 | 830 | 200 | 770 | 120 | −9 | 18 | 190 |
| 51 | AF | 530 | 6900 | 56.3 | 860 | 130 | 780 | 90 | −33 | 10 | 380 |
| 52 | AG | 580 | 7200 | 77.8 | 900 | 90 | 800 | 200 | −13 | 12 | 400 |
| 53 | AH | 490 | 6900 | 70.0 | 890 | 200 | 810 | 180 | −8 | 10 | 200 |
| 54 | AI | 620 | 8300 | 56.3 | 940 | 210 | 850 | 300 | −24 | 34 | 190 |
| 55 | AJ | 650 | 8500 | 43.8 | 840 | 70 | 790 | 160 | −13 | 17 | 480 |
| 56 | AK | 530 | 7400 | 57.9 | 860 | 420 | 800 | 500 | −7 | 10 | 450 |
| 57 | AL | 570 | 7000 | 62.5 | 850 | 330 | 840 | 250 | −8 | 16 | 210 |
| 58 | AM | 550 | 7600 | 59.1 | 890 | 190 | 750 | 150 | −3 | 11 | 220 |
| 59 | AN | 520 | 6300 | 55.6 | 870 | 220 | 810 | 80 | −9 | 26 | 400 |
| 60 | AO | 610 | 8100 | 50.0 | 830 | 300 | 870 | 160 | −7 | 12 | 160 |
| 61 | AP | 580 | 7600 | 50.0 | 900 | 150 | R40 | 300 | −5 | 13 | 220 |
| 62 | AQ | 550 | 6900 | 60.0 | 840 | 230 | 810 | 240 | −3 | 13 | 420 |
| 64 | AS | 590 | 7000 | 61.1 | 870 | 200 | 810 | 250 | −12 | 13 | 200 |
| 65 | AS | 500 | 7600 | 60.0 | 850 | 150 | 800 | 150 | −16 | 15 | 480 |
| 66 | AS | 590 | 8000 | 61.1 | 840 | 200 | 800 | 200 | −18 | 12 | 210 |
| 67 | AS | 560 | 8200 | 62.5 | 860 | 300 | 810 | 230 | −17 | 12 | 480 |
| 68 | AT | 520 | 7600 | 60.0 | 870 | 250 | 800 | 200 | −15 | 14 | 200 |
| 69 | AT | 580 | 8000 | 62.5 | 860 | 200 | 820 | 180 | −12 | 15 | 500 |
| 70 | AT | 560 | 7600 | 61.1 | 850 | 180 | 820 | 200 | −15 | 13 | 220 |
| 71 | AT | 540 | 8000 | 60.0 | 840 | 200 | 820 | 250 | −22 | 12 | 490 |
| 72 | AU | 560 | 8200 | 62.5 | 850 | 250 | 800 | 200 | −18 | 14 | 200 |
| 73 | AU | 520 | 7800 | 61.1 | 860 | 220 | 800 | 220 | −18 | 13 | 480 |
| 74 | AV | 570 | 8000 | 64.7 | 850 | 220 | 810 | 220 | −6 | 13 | 400 |
| 75 | AW | 490 | 6000 | 65.0 | 860 | 200 | 830 | 250 | −15 | 13 | 400 |
| 76 | AX | 580 | 8000 | 61.1 | 840 | 180 | 800 | 200 | −5 | 13 | 400 |

| | Second annealing step Bending and unbending | | Reheating step (first embodiment) | | Plating step | | Dehydrogenation step | | Reheating step (second embodiment) | | |
|---|---|---|---|---|---|---|---|---|---|---|---|
| No. | Roller radius (mm) | Count (times) | Reheating temperature (°C.) | Holding time (seconds) | Type* | Alloying temperature (°C.) | Processing temperature (°C.) | Holding time (h) | Cooling stop temperature (°C.) | Reheating temperature (°C.) | Holding time (seconds) |
| 42 | 400 | 14 | 390 | 250 | GA | 490 | | | | | |
| 43 | 450 | 9 | | | GA | 520 | | | 80 | 320 | 200 |
| 44 | 550 | 5 | | | GA | 490 | | | 180 | 420 | 180 |
| 45 | 700 | 12 | 400 | 60 | GA | 520 | 200 | 2 | | | |
| 46 | 550 | 6 | 380 | 200 | GA | 500 | | | | | |
| 47 | 450 | 8 | | | GA | 510 | | | 180 | 390 | 80 |
| 48 | 550 | 9 | | | GA | 500 | | | 190 | 400 | 200 |
| 49 | 500 | 11 | 370 | 70 | GA | 500 | 60 | 65 | | | |
| 50 | 450 | 8 | 380 | 120 | GA | 560 | | | | | |
| 51 | 400 | 14 | | | GI | | | | 210 | 400 | 120 |
| 52 | 450 | 12 | | | GA | 530 | | | 190 | 420 | 40 |
| 53 | 400 | 7 | 480 | 60 | GA | 500 | 90 | 14 | | | |
| 54 | 600 | 6 | 400 | 600 | CR | | | | | | |
| 55 | 500 | 9 | | | GA | 530 | | | 190 | 380 | 450 |
| 56 | 650 | 9 | | | GA | 490 | | | 180 | 410 | 200 |
| 57 | 500 | 15 | 380 | 150 | GA | 500 | | | | | |
| 58 | 550 | 9 | 410 | 100 | GA | 520 | 100 | 10 | | | |
| 59 | 450 | 8 | | | GI | | | | 310 | 480 | 100 |
| 60 | 400 | 7 | 250 | 80 | GA | 510 | 90 | 50 | | | |
| 61 | 500 | 12 | 400 | 100 | GA | 490 | 260 | 1 | | | |
| 62 | 400 | 9 | | | GA | 500 | | | 210 | 400 | 60 |
| 64 | 500 | 7 | 410 | 100 | GA | 500 | 70 | 20 | | | |
| 65 | 450 | 7 | | | GA | | | | 200 | 400 | 60 |
| 66 | 450 | 8 | 400 | 60 | GI | 500 | 90 | 20 | | | |
| 67 | 500 | 6 | | | GI | | | | 190 | 370 | 80 |
| 68 | 450 | 9 | 390 | 100 | GA | 490 | 100 | 10 | | | |

TABLE 2-2-continued

| 69 | 500 | 8 |     |    | GA |     |     |    | 210 | 380 | 60  |
| 70 | 500 | 7 | 380 | 80 | GI | 500 | 70  | 25 |     |     |     |
| 71 | 450 | 6 |     |    | GI |     |     |    | 200 | 400 | 100 |
| 72 | 500 | 8 | 410 | 60 | GA | 490 | 120 | 7  |     |     |     |
| 73 | 450 | 6 |     |    | GA |     |     |    | 200 | 390 | 50  |
| 74 | 500 | 8 |     |    | GA | 530 |     |    | 200 | 410 | 70  |
| 75 | 450 | 7 |     |    | GA | 520 |     |    | 190 | 360 | 80  |
| 76 | 400 | 9 |     |    | GA | 510 |     |    | 220 | 390 | 60  |

*CR: cold-rolled steel sheet (without plating),
GI: hot-dip galvanized steel sheet,
GA: hot-dip galvannealed steel sheet For the steel sheets and the coated steel sheets used as test steels, tensile properties, stretch-flangeability (hole expandability), LME resistance, and delayed fracture resistance were evaluated in accordance with the following test methods. The ferrite area fraction, the tempered martensite area fraction, the bainitic ferrite area fraction, and the retained austenite volume fraction of each steel sheet were measured by the following methods. The Si concentration and Mn concentration were measured by the following methods in a region within 4.9 μm in the thickness direction from the surface of the steel sheet and at a quarter thickness position of the steel sheet. The thickness of a soft layer present in the thickness direction from the surface of the steel sheet, the average grain size of crystal grains containing an oxide of Si and/or Mn in the region within 4.9 μm in the thickness direction from the surface of the steel sheet, and the amount of diffusible hydrogen in the steel sheet were also measured by the methods described above. Table 3 shows the results.

The ferrite, bainitic ferrite, and tempered martensite area fractions are measured by the following method. The area fractions were measured at a quarter thickness position.

A sample was cut such that a cross section of a steel sheet in the thickness direction parallel to the rolling direction became an observation surface. The observation surface was then mirror-polished with a diamond paste, was finally polished with colloidal silica, and was etched with 3% by volume nital to expose a microstructure. Three fields in a 17 μm×23 μm field range were observed with a scanning electron microscope (SEM) at an accelerating voltage of 15 kV and at a magnification of 5000 times. In a microstructure image thus taken, the area fraction was calculated by dividing the area of each constituent microstructure (ferrite, bainitic ferrite, tempered martensite) by the measurement area in three fields using Adobe Photoshop available from Adobe Systems, and the area fractions were averaged to determine the area fraction of each microstructure.

The retained austenite volume fraction is measured by the following method. A steel sheet was mechanically ground in the thickness direction (depth direction) to a quarter thickness and was then chemically polished with oxalic acid to form an observation surface. The observation surface was observed by X-ray diffractometry.

A Mo Kα radiation source was used for incident X-rays. The ratio of the diffraction intensities of (200), (220), and (311) planes of fcc iron (austenite) to the diffraction intensities of (200), (211), and (220) planes of bcc iron was determined as the retained austenite volume fraction.

The other steel sheet microstructure (remaining microstructure) may be determined by SEM observation, for example.

The Si concentration $T_{Si}$ and the Mn concentration $T_{Mn}$ at a quarter thickness position of a steel sheet were determined with a field emission-electron probe micro analyzer (FE-EPMA) from the average of 10 points of point analysis at an electron beam diameter of 1 μm at a quarter thickness position of the steel sheet. For the Si concentration in the region within 4.9 μm in the thickness direction from the surface of the steel sheet, the concentration distribution of the Si concentration in the range of 0 to 4.9 μm in the thickness direction from the surface of the steel sheet was determined by line analysis with a field emission-electron probe micro analyzer at an electron beam diameter of 0.1 μm from the surface of the steel sheet in the thickness direction. The lowest Si concentration in the concentration distribution is defined as the concentration $L_{Si}$. Also for the Mn concentration in the region within 4.9 μm in the thickness direction from the surface of the steel sheet, the concentration distribution of the Mn concentration in the range of 0 to 4.9 μm in the thickness direction from the surface of the steel sheet was determined by line analysis with a field emission-electron probe micro analyzer at an electron beam diameter of 0.1 μm from the surface of the steel sheet in the thickness direction. The lowest Mn concentration in the concentration distribution is defined as the concentration $L_{Mn}$. The Si concentration, the Mn concentration, $L_{Si}$, $T_{Si}$, $L_{Mn}$, and $T_{Mn}$ are expressed in % by mass. In the measurement of the Si concentration and the Mn concentration with a field emission-electron probe micro analyzer in the disclosed embodiments, 10 positions without particulate matter are measured and averaged as the Si concentration and the Mn concentration.

SEM observation and energy dispersive X-ray analysis (EDX) on a cross section (L cross section) of a steel sheet were performed to determine the type of oxide in the region within 4.9 μm in the thickness direction from the surface of the steel sheet and to measure the average grain size of crystal grains containing an oxide of Si and/or Mn. The average grain size of crystal grains is the average length of grain sizes measured by microtomy in a cross section (L cross section) of a steel sheet in a direction parallel to the surface of the steel sheet.

Measurement is performed on the soft layer as described below. After smoothing a thickness cross section (L cross section: a cross section parallel to the rolling direction and perpendicular to the surface of the steel sheet) parallel to the rolling direction of the steel sheet by wet grinding, measurement was performed with a Vickers hardness tester at a load of 10 gf from a 1-μm position to a 100-μm position in the thickness direction from the surface of the steel sheet at intervals of 1 μm. Measurement was then performed at intervals of 20 μm to the central portion in the thickness direction. A region with hardness corresponding to 65% or less of the hardness at a quarter thickness position is defined as a soft layer, and the thickness of the region in the thickness direction is defined as the thickness of the soft layer.

The amount of diffusible hydrogen in a steel sheet is measured by the following method.

For a cold-rolled steel sheet, a test specimen 30 mm in length and 5 mm in width was taken. For a steel sheet with a hot-dip galvanized layer or a hot-dip galvannealed layer on its surface, a test specimen 30 mm in length and 5 mm in width was taken, and the hot-dip galvanized layer or hot-dip galvannealed layer was removed with alkali. The amount of hydrogen released from the test specimen was then measured by a temperature-programmed desorption analysis method.

More specifically, a test specimen is continuously heated from room temperature to 300° C. at a heating rate of 200° C./h and is then cooled to room temperature. The cumulative amount of hydrogen released from the test specimen from room temperature to 210° C. is measured as the amount of diffusible hydrogen in the steel sheet.

<Tensile Properties>

The tensile test was performed in accordance with JIS Z 2241. A JIS No. 5 test specimen was taken from the steel sheet such that the longitudinal direction was perpendicular to the rolling direction of the steel sheet. The YS, TS, and total elongation (El) of the test specimen were measured at a crosshead speed of 10 mm/min in the tensile test. In the disclosed embodiments, TS of 1180 MPa or more and YS and El satisfying the following conditions were judged to be acceptable.

If 1180 MPa≤TS<1320 MPa, then 700 MPa≤YS, and 13%≤El

If 1320 MPa≤TS<1470 MPa, then 850 MPa≤YS, and 11%≤El

If 1470 MPa≤TS, then 1000 MPa≤YS, and 9%≤El

<Stretch-Flangeability (Hole Expandability)>

The stretch-flangeability (hole expandability) was evaluated in a hole expanding test. The hole expanding test was performed in accordance with JIS Z 2256. A 100 mm×100 mm sample was taken by shearing from the steel sheet. A hole with a diameter of 10 mm was punched in the sample with a clearance of 12.5%. While the periphery of the hole was held using a die with an inner diameter of 75 mm at a blank holding force of 9 ton (88.26 kN), the hole diameter at the crack initiation limit was measured by pushing a conical punch with a vertex angle of 60 degrees into the hole. The critical hole expansion ratio λ (%) was calculated using the following formula, and the hole expandability was evaluated from the critical hole expansion ratio.

$$\lambda(\%) = \{(D_f - D_0)/D_0\} \times 100$$

In this formula, $D_f$ denotes the hole diameter (mm) at the time of cracking, and $D_0$ denotes the initial hole diameter (mm). In the disclosed embodiments, when λ was 20% or more, the stretch-flangeability was judged to be good.

<LME Resistance>

The LME resistance was determined by a resistance welding cracking test. A test specimen of a steel sheet cut to 30 mm×100 mm in a longitudinal direction perpendicular to the rolling direction and another test specimen made of a 980 MPa grade hot-dip galvanized steel sheet were subjected to resistance welding (spot welding) to produce a member. A set of the two steel sheets tilted 5 degrees was subjected to resistance spot welding in a servomotor pressurization type single-phase alternating current (50 Hz) resistance welding machine attached to a welding gun. The welding conditions included a welding pressure of 3.8 kN and a holding time of 0.2 seconds. The welding current ranged from 5.7 to 6.2 kA, the weld time was 21 cycles, and the holding time was 5 cycles. A test specimen was cut in half after the welding, and a cross section was observed with an optical microscope. A test specimen with no crack of 0.02 mm or more was judged to be very good LME cracking (⊙), a test specimen with a crack of 0.02 mm or more and less than 0.1 mm was judged to be good LME cracking (O), and a test specimen with a crack of 0.1 mm or more was judged to be poor LME cracking (X).

<Delayed Fracture Resistance>

The delayed fracture resistance was evaluated in a hydrochloric acid immersion test of a V-bending sample subjected to stress. A test specimen 1.4 mm in thickness, 30 mm in width, and 110 mm in length was taken by shearing. A Φ15 mm hole centered at the center of the width and at 17.5 mm from a longitudinal end of the test specimen was punched. The conditions for the shearing were as follows: with a blank holder, at a shear rake angle of 0.5 degrees, at a shear clearance of 15%, and with a shear blade used 1000 shots or more. The test specimen was then subjected to 90-degree V-bending at R/t=5.0, wherein the bend radius (R) was divided by the thickness (t), and the tightening of a bolt through the Φ15 mm hole was adjusted such that the stress at the top of the V-bending was the YS of the material ±50 MPa. The V-bending sample subjected to the stress was immersed in hydrochloric acid and was checked for cracks. The conditions for the immersion were as follows: an immersion solution of hydrochloric acid with pH=3 under constant control, a liquid temperature of 25° C., and an immersion time of 96 hours. In the disclosed embodiments, no crack of 1 mm or more after the hydrochloric acid immersion test was judged to be high delayed fracture resistance (O), and a crack of 1 mm or more was judged to be low delayed fracture resistance (X).

Table 3 shows the results.

TABLE 3-1

| No. | Steel type | Thickness (mm) | F area fraction (%) | BF area fraction (%) | TM area fraction (%) | RA volume fraction (%) | Remaining microstructure | *1 (μm) | $L_{Si}$ (mass %) | $L_{Mn}$ (mass %) | $T_{Si}$ (mass %) | $T_{Mn}$ (mass %) | *2 |
|---|---|---|---|---|---|---|---|---|---|---|---|---|---|
| 1 | A | 1.2 | 16 | 20 | 42 | 12 | M, θ | 4.5 | 0.27 | 0.35 | 1.12 | 2.99 | 6.6 |
| 2 | B | 1.6 | 20 | 17 | 38 | 13 | M, θ | 3.0 | 0.15 | 0.43 | 0.89 | 2.83 | 6.4 |
| 3 | C | 1.2 | 18 | 22 | 41 | 10 | M, θ, P | 3.8 | 0.28 | 0.39 | 1.83 | 2.78 | 6.9 |
| 4 | D | 1.0 | 15 | 24 | 42 | 12 | M, θ | 3.9 | 0.19 | 0.45 | 1.54 | 2.85 | 6.9 |
| 5 | E | 1.2 | 13 | 18 | 43 | 11 | M, θ | 3.1 | 0.28 | 0.41 | 1.50 | 2.89 | 6.4 |
| 6 | E | 1.4 | 18 | 20 | 38 | 12 | M, θ, P | 0.6 | 0.36 | 0.55 | 1.50 | 2.89 | 4.8 |
| 7 | E | 1.4 | 15 | 20 | 39 | 11 | M, θ | 0.7 | 0.35 | 0.53 | 1.50 | 2.89 | 5.0 |
| 9 | E | 1.6 | 72 | 6 | 9 | 8 | M, θ, P | 2.1 | 0.33 | 0.57 | 1.50 | 2.89 | 4.9 |
| 10 | E | 1.2 | 70 | 7 | 10 | 8 | M, θ | 2.5 | 0.35 | 0.54 | 1.50 | 2.89 | 4.9 |
| 11 | E | 1.2 | 69 | 7 | 0 | 3 | M, θ | 3.2 | 0.31 | 0.55 | 1.50 | 2.89 | 5.1 |
| 12 | E | 1.6 | 2 | 24 | 42 | 2 | M, θ, P | 2.3 | 0.34 | 0.50 | 1.50 | 2.89 | 5.2 |
| 13 | E | 1.8 | 1 | 23 | 44 | 12 | M, θ | 2.8 | 0.33 | 0.55 | 1.50 | 2.89 | 5.0 |
| 14 | E | 1.6 | 18 | 17 | 43 | 14 | M, θ, P | 0.5 | 0.55 | 1.05 | 1.50 | 2.89 | 2.7 |

TABLE 3-1-continued

| No. | | | | | | | | | | | | | |
|---|---|---|---|---|---|---|---|---|---|---|---|---|---|
| 15 | E | 1.6 | 59 | 10 | 23 | 6 | M, θ | 2.4 | 0.35 | 0.55 | 1.50 | 2.89 | 4.9 |
| 16 | E | 1.4 | 13 | 24 | 29 | 2 | M, θ, P | 2.3 | 0.28 | 0.54 | 1.50 | 2.89 | 5.4 |
| 17 | E | 1.2 | 19 | 18 | 48 | 2 | M, θ | 3.2 | 0.30 | 0.48 | 1.50 | 2.89 | 5.6 |
| 18 | E | 1.4 | 16 | 20 | 40 | 9 | M, θ | 0.2 | 0.59 | 1.04 | 1.50 | 2.89 | 2.7 |
| 19 | E | 1.2 | 17 | 21 | 40 | 3 | M, θ, P | 2.4 | 0.30 | 0.54 | 1.50 | 2.89 | 5.2 |
| 20 | E | 1.2 | 19 | 20 | 38 | 4 | M, θ, P | 2.7 | 0.36 | 0.54 | 1.50 | 2.89 | 4.9 |
| 22 | E | 1.2 | 14 | 20 | 32 | 2 | M, θ, P | 2.8 | 0.28 | 0.52 | 1.50 | 2.89 | 5.5 |
| 24 | E | 1.6 | 16 | 20 | 38 | 2 | M, θ, P | 3.1 | 0.29 | 0.50 | 1.50 | 2.89 | 5.6 |
| 25 | E | 1.8 | 18 | 18 | 38 | 3 | M, θ, P | 2.7 | 0.36 | 0.49 | 1.50 | 2.89 | 5.2 |
| 26 | F | 1.4 | 11 | 17 | 48 | 10 | M, θ | 3.2 | 0.18 | 0.75 | 0.91 | 3.41 | 4.6 |
| 27 | G | 1.6 | 13 | 16 | 47 | 9 | M, θ, P | 3.3 | 0.27 | 0.64 | 1.45 | 3.14 | 5.0 |
| 28 | H | 1.2 | 8 | 21 | 49 | 8 | M, θ | 3.2 | 0.19 | 0.72 | 0.83 | 3.21 | 4.4 |
| 29 | I | 1.4 | 9 | 21 | 48 | 7 | M, θ | 3.6 | 0.30 | 0.61 | 1.67 | 3.04 | 5.2 |
| 30 | J | 1.2 | 17 | 22 | 39 | 13 | M, θ | 3.3 | 0.22 | 0.38 | 0.95 | 2.85 | 6.3 |
| 33 | M | 1.4 | 18 | 14 | 45 | 2 | M, θ, P | 0.7 | 0.09 | 0.38 | 0.03 | 2.89 | 6.2 |
| 34 | N | 1.4 | 16 | 19 | 38 | 14 | M, θ | 3.1 | 0.55 | 0.45 | 2.75 | 2.83 | 5.6 |
| 35 | O | 1.2 | 2 | 24 | 45 | 4 | M, θ, P | 3.2 | 0.28 | 0.26 | 1.45 | 4.53 | 11.1 |
| 37 | Q | 1.4 | 16 | 23 | 40 | 12 | M, θ | 3.6 | 0.22 | 0.34 | 1.65 | 2.78 | 7.9 |
| 38 | S | 1.4 | 16 | 19 | 40 | 14 | M, θ | 2.6 | 0.19 | 0.35 | 1.79 | 3.02 | 8.9 |
| 39 | T | 1.6 | 13 | 23 | 39 | 10 | M, θ | 2.8 | 0.27 | 0.30 | 1.52 | 3.10 | 8.1 |
| 40 | U | 2.3 | 14 | 22 | 38 | 11 | M, θ | 3.2 | 0.19 | 0.35 | 1.74 | 2.92 | 8.6 |
| 41 | V | 2.0 | 17 | 18 | 44 | 9 | M, θ, P | 3.0 | 0.09 | 0.28 | 1.32 | 2.78 | 11.1 |

| No. | Thickness of soft later (μm) | Average grain size of crystal grains containing oxide of Si and/or Mn (μm) | $T_{Mn}/L_{Mn}$ | Amount of diffusible hydrogen (mass ppm) | TS (MPa) | YS (MPa) | El (%) | λ (%) | Resistance to LME | Delayed fracture resistance | Type* | Notes |
|---|---|---|---|---|---|---|---|---|---|---|---|---|
| 1 | 48.0 | 5.2 | 8.54 | 0.06 | 1230 | 920 | 16.5 | 37 | O | O | GA | Working example |
| 2 | 42.0 | 3.6 | 6.58 | 0.08 | 1205 | 930 | 17.3 | 42 | O | O | GI | Working example |
| 3 | 38.0 | 5.5 | 7.13 | 0.02 | 1198 | 965 | 17.5 | 40 | O | O | GA | Working example |
| 4 | 11.0 | 3.2 | 6.33 | 0.04 | 1217 | 998 | 15.8 | 41 | O | O | CR | Working example |
| 5 | 13.0 | 5.4 | 7.05 | 0.05 | 1198 | 918 | 16.8 | 38 | O | O | GA | Working example |
| 6 | 14.0 | 10.1 | 5.25 | 0.07 | 1236 | 880 | 13.9 | 28 | X | X | GA | Comparative example |
| 7 | 9.0 | 5.6 | 5.45 | 0.37 | 1224 | 950 | 14.5 | 24 | X | X | GA | Comparative example |
| 9 | 25.0 | 8.3 | 5.07 | 0.04 | 1196 | 500 | 14.3 | 13 | O | O | GA | Comparative example |
| 10 | 28.0 | 3.9 | 6.36 | 0.20 | 1203 | 530 | 13.7 | 10 | O | O | GI | Comparative example |
| 11 | 40.0 | 6.6 | 5.25 | 0.09 | 947 | 390 | 14.8 | 31 | O | O | GA | Comparative example |
| 12 | 35.0 | 7.1 | 5.78 | 0.26 | 1217 | 925 | 7.8 | 30 | O | O | GA | Comparative example |
| 13 | 27.0 | 3.8 | 5.25 | 0.42 | 1231 | 965 | 8.8 | 9 | O | O | GA | Comparative example |
| 14 | 4.0 | 7.0 | 2.75 | 0.24 | 1213 | 889 | 14.8 | 21 | X | X | GA | Comparative example |
| 15 | 28.0 | 3.4 | 5.25 | 0.11 | 1195 | 540 | 14.5 | 37 | O | O | GA | Comparative example |
| 16 | 31.0 | 5.6 | 5.35 | 0.08 | 1189 | 945 | 68 | 33 | O | O | GA | Comparative example |
| 17 | 35.0 | 8.6 | 6.02 | 0.36 | 1224 | 545 | 14.2 | 10 | O | O | GA | Comparative example |
| 18 | 3.0 | 3.9 | 2.78 | 0.10 | 1220 | 968 | 15.1 | 22 | X | X | GA | Comparative example |
| 19 | 22.0 | 5.3 | 5.35 | 0.05 | 978 | 980 | 7.8 | 41 | O | O | GA | Comparative example |
| 20 | 23.0 | 6.5 | 5.35 | 0.07 | 1232 | 535 | 8.5 | 14 | O | O | GA | Comparative example |
| 22 | 42.0 | 3.8 | 5.56 | 0.06 | 1241 | 903 | 7.6 | 39 | O | O | GA | Comparative example |
| 24 | 48.0 | 3.4 | 5.78 | 0.05 | 953 | 920 | 7.2 | 48 | O | O | GA | Comparative example |
| 25 | 29.0 | 5.6 | 5.90 | 0.07 | 1199 | 520 | 6.9 | 8 | O | O | GA | Comparative example |
| 26 | 45.0 | 3.1 | 4.55 | 0.04 | 1369 | 1050 | 14.2 | 27 | O | O | GA | Working example |
| 27 | 9.0 | 3.3 | 4.91 | 0.07 | 1338 | 985 | 13.6 | 26 | O | O | GA | Working example |

TABLE 3-1-continued

| | | | | | | | | | | | |
|---|---|---|---|---|---|---|---|---|---|---|---|
| 28 | 15.0 | 2.2 | 4.46 | 0.05 | 1506 | 1105 | 12.4 | 24 | O | O | GI | Working example |
| 29 | 8.0 | 2.6 | 4.98 | 0.02 | 1485 | 1120 | 12.9 | 23 | O | O | CR | Working example |
| 30 | 34.0 | 6.5 | 7.50 | 0.34 | 1210 | 1007 | 16.2 | 32 | O | O | GA | Working example |
| 33 | 19.0 | 7.9 | 7.61 | 0.02 | 1221 | 1004 | 12.3 | 37 | O | O | GA | Comparative example |
| 34 | 38.0 | 8.1 | 6.29 | 0.04 | 1189 | 890 | 13.8 | 12 | X | X | GA | Comparative example |
| 35 | 37.0 | 3.7 | 17.42 | 0.21 | 907 | 604 | 19.7 | 44 | O | O | GI | Comparative example |
| 37 | 34.0 | 5.4 | 8.18 | 0.05 | 1225 | 952 | 16.8 | 38 | O | O | GI | Working example |
| 38 | 26.0 | 5.8 | 8.63 | 0.07 | 1204 | 884 | 16.5 | 37 | O | O | GA | Working example |
| 39 | 12.0 | 7.4 | 10.33 | 0.02 | 1245 | 935 | 17.1 | 41 | O | O | CR | Working example |
| 40 | 48.0 | 10.9 | 8.34 | 0.29 | 1195 | 852 | 19.2 | 39 | O | O | GA | Working example |
| 41 | 9.0 | 5.4 | 9.93 | 0.04 | 1187 | 884 | 18.1 | 45 | O | O | GA | Working example |

*1: the thickness of a region with a Si concentration not more than one-third of the Si concentration in a chemical composition of a steel sheet and with a Mn concentration not more than one-third of the Mn concentration in the chemical composition of the steel sheet in a region within 4.9 μm in a thickness direction from a surface of the steel sheet

*2: $(T_{Si} + T_{Mn})/(L_{Si} + L_{Mn})$

F: ferrite,
BF: bainitic ferrite
TM: tempered martensite (excluding M and RA),
RA: retained austenite,
M: fresh martensite,
P: pearlite,
θ: carbides, such as cementite,
*CR: cold-rolled steel sheet,
GI: hot-dip galvanized steel sheet,
GA: hot-dip glivannealed steel sheet

TABLE 3-2

| No. | Steel type | Thickness (mm) | F area fraction (%) | BF area fraction (%) | TM area fraction (%) | RA volume fraction (%) | Remaining microstructure | *1 (μm) | $L_{Si}$ (mass %) | $L_{Mn}$ (mass %) | $T_{Si}$ (mass %) | $T_{Mn}$ (mass %) | *2 |
|---|---|---|---|---|---|---|---|---|---|---|---|---|---|
| 42 | W | 1.2 | 13 | 20 | 41 | 14 | M, θ | 4.6 | 0.25 | 0.37 | 1.39 | 2.99 | 7.1 |
| 43 | X | 1.4 | 14 | 19 | 43 | 11 | M, θ, P | 3.1 | 0.39 | 0.40 | 1.95 | 3.72 | 7.2 |
| 44 | Y | 1.2 | 18 | 21 | 40 | 8 | M, θ | 3.9 | 0.28 | 0.45 | 1.22 | 3.12 | 5.9 |
| 45 | Z | 1.2 | 18 | 20 | 41 | 15 | M, θ | 4.0 | 0.08 | 0.29 | 0.29 | 2.72 | 8.1 |
| 46 | AA | 1.4 | 16 | 24 | 42 | 14 | M, θ, P | 3.2 | 0.25 | 0.49 | 1.03 | 3.11 | 5.6 |
| 47 | AB | 1.0 | 14 | 20 | 39 | 13 | M, θ, P | 2.9 | 0.27 | 0.43 | 1.28 | 3.22 | 6.4 |
| 48 | AC | 1.6 | 13 | 23 | 41 | 11 | M, θ | 4.3 | 0.19 | 0.43 | 0.84 | 3.14 | 6.4 |
| 49 | AD | 1.8 | 17 | 22 | 37 | 9 | M, θ, P | 4.6 | 0.19 | 0.35 | 1.36 | 2.91 | 7.9 |
| 50 | AE | 1.6 | 13 | 25 | 35 | 12 | M, θ | 4.0 | 0.24 | 0.43 | 1.66 | 3.23 | 7.3 |
| 51 | AF | 1.4 | 14 | 27 | 41 | 13 | M, θ | 3.2 | 0.17 | 0.33 | 0.82 | 2.82 | 7.3 |
| 52 | AG | 0.8 | 16 | 23 | 42 | 10 | M, θ, P | 2.6 | 0.25 | 0.45 | 1.29 | 3.14 | 6.3 |
| 53 | AH | 1.2 | 17 | 19 | 38 | 12 | M, θ | 4.1 | 0.31 | 0.50 | 1.37 | 3.05 | 5.5 |
| 54 | AI | 1.4 | 18 | 14 | 33 | 26 | M, θ | 2.8 | 0.29 | 0.53 | 1.68 | 2.95 | 5.6 |
| 55 | AJ | 1.8 | 17 | 17 | 42 | 16 | M, θ | 3.7 | 0.22 | 0.48 | 1.63 | 2.78 | 6.3 |
| 56 | AK | 1.6 | 18 | 22 | 38 | 15 | M, θ, P | 3.3 | 0.33 | 0.41 | 1.69 | 3.12 | 6.5 |
| 57 | AL | 1.2 | 13 | 24 | 38 | 14 | M, θ | 4.6 | 0.30 | 0.38 | 1.22 | 3.04 | 6.3 |
| 58 | AM | 1.8 | 19 | 18 | 39 | 10 | M, θ | 3.2 | 0.32 | 0.31 | 1.76 | 2.88 | 7.4 |
| 59 | AN | 1.6 | 19 | 20 | 43 | 12 | M, θ | 3.9 | 0.27 | 0.36 | 1.52 | 2.99 | 7.2 |
| 60 | AO | 1.4 | 14 | 21 | 41 | 9 | M, θ, P | 4.2 | 0.23 | 0.38 | 1.20 | 3.22 | 7.2 |
| 61 | AP | 1.6 | 17 | 19 | 39 | 10 | M, θ, P | 3.0 | 0.18 | 0.31 | 1.13 | 2.92 | 8.3 |
| 62 | AQ | 1.2 | 18 | 21 | 41 | 11 | M, θ | 3.6 | 0.24 | 0.35 | 1.60 | 3.12 | 8.0 |
| 64 | AS | 1.4 | 15 | 17 | 47 | 9 | M, θ, P | 2.2 | 0.11 | 0.71 | 0.89 | 2.95 | 4.7 |
| 65 | AS | 1.6 | 17 | 19 | 43 | 12 | M, θ | 1.8 | 0.12 | 0.73 | 0.89 | 2.95 | 4.5 |
| 66 | AS | 1.4 | 14 | 15 | 44 | 13 | M, θ | 2.1 | 0.11 | 0.74 | 0.89 | 2.95 | 4.5 |
| 67 | AS | 1.2 | 13 | 19 | 48 | 12 | M, θ | 1.3 | 0.13 | 0.69 | 0.89 | 2.95 | 4.7 |
| 68 | AT | 1.6 | 16 | 20 | 45 | 10 | M, θ, P | 2.8 | 0.14 | 0.75 | 0.85 | 2.89 | 4.2 |
| 69 | AT | 1.2 | 15 | 17 | 44 | 12 | M, θ | 2.1 | 0.13 | 0.70 | 0.85 | 2.89 | 4.5 |
| 70 | AT | 1.4 | 14 | 16 | 47 | 13 | M, θ | 2.0 | 0.12 | 0.73 | 0.85 | 2.89 | 4.4 |
| 71 | AT | 1.6 | 17 | 18 | 45 | 12 | M, θ | 1.7 | 0.11 | 0.75 | 0.85 | 2.89 | 4.3 |
| 72 | AU | 1.2 | 10 | 22 | 49 | 6 | M, θ, P | 2.9 | 0.17 | 0.88 | 1.05 | 3.21 | 4.1 |
| 73 | AU | 1.4 | 9 | 23 | 48 | 7 | M, θ | 2.0 | 0.21 | 0.84 | 1.05 | 3.21 | 4.1 |
| 74 | AV | 1.2 | 13 | 18 | 44 | 11 | M, θ | 2.7 | 0.31 | 0.42 | 1.34 | 2.89 | 5.8 |
| 75 | AW | 1.4 | 12 | 22 | 40 | 13 | M, θ | 3.3 | 0.19 | 0.61 | 1.08 | 3.01 | 5.1 |
| 76 | AX | 1.4 | 14 | 19 | 45 | 12 | M, θ | 3.6 | 0.13 | 0.72 | 0.88 | 3.21 | 4.8 |

TABLE 3-2-continued

| No. | Thickness of soft later (μm) | Average grain size of crystal grains containing oxide of Si and/or Mn (μm) | $T_{Mn}/L_{Mn}$ | Amount of diffusible hydrogen (mass ppm) | TS (MPa) | YS (MPa) | EI (%) | λ (%) | Resistance to LME | Delayed fracture resistance | Type* | Notes |
|---|---|---|---|---|---|---|---|---|---|---|---|---|
| 42 | 12.0 | 7.9 | 8.08 | 0.32 | 1208 | 939 | 16.9 | 42 | O | O | GA | Working example |
| 43 | 43.0 | 8.1 | 9.30 | 0.08 | 1185 | 855 | 18.6 | 38 | O | O | GA | Working example |
| 44 | 36.0 | 3.7 | 6.93 | 0.06 | 1283 | 952 | 16.4 | 46 | O | O | GA | Working example |
| 45 | 11.0 | 6.2 | 9.38 | 0.03 | 1195 | 842 | 18.6 | 43 | O | O | GA | Working example |
| 46 | 28.0 | 6.9 | 6.35 | 0.32 | 1225 | 858 | 16.4 | 39 | O | O | GA | Working example |
| 47 | 35.0 | 3.8 | 7.49 | 0.08 | 1258 | 889 | 15.6 | 48 | O | O | GA | Working example |
| 48 | 12.0 | 7.2 | 7.30 | 0.03 | 1224 | 941 | 14.9 | 42 | O | O | GA | Working example |
| 49 | 48.0 | 3.8 | 8.31 | 0.06 | 1189 | 904 | 17.2 | 33 | O | O | GA | Working example |
| 50 | 8.0 | 7.0 | 7.51 | 0.39 | 1196 | 895 | 16.4 | 38 | O | O | GA | Working example |
| 51 | 14.0 | 3.4 | 8.55 | 0.04 | 1198 | 831 | 15.2 | 47 | O | O | GI | Working example |
| 52 | 55.0 | 5.6 | 6.98 | 0.07 | 1207 | 864 | 18.6 | 37 | O | O | GA | Working example |
| 53 | 7.0 | 8.6 | 6.10 | 0.09 | 1192 | 872 | 15.9 | 49 | O | O | GA | Working example |
| 54 | 13.0 | 3.9 | 5.57 | 0.03 | 1216 | 924 | 19.2 | 43 | O | O | CR | Working example |
| 55 | 48.0 | 5.3 | 5.79 | 0.06 | 1239 | 912 | 14.4 | 46 | O | O | GA | Working example |
| 56 | 8.0 | 6.5 | 7.61 | 0.08 | 1184 | 845 | 19.2 | 40 | O | O | GA | Working example |
| 57 | 32.0 | 8.4 | 8.00 | 0.32 | 1266 | 962 | 13.1 | 38 | O | O | GA | Working example |
| 58 | 17.0 | 3.8 | 9.29 | 0.09 | 1196 | 864 | 17.2 | 47 | O | O | GA | Working example |
| 59 | 9.0 | 6.7 | 8.31 | 0.16 | 1205 | 885 | 16.4 | 45 | O | O | GI | Working example |
| 60 | 16.0 | 3.4 | 8.47 | 0.03 | 1192 | 852 | 18.2 | 44 | O | O | GA | Working example |
| 61 | 33.0 | 5.6 | 9.42 | 0.04 | 1224 | 916 | 15.6 | 38 | O | O | GA | Working example |
| 62 | 12.0 | 3.3 | 8.91 | 0.07 | 1238 | 898 | 16.2 | 42 | O | O | GA | Working example |
| 64 | 16.4 | 4.8 | 4.15 | 0.02 | 1195 | 950 | 16.9 | 41 | O | O | GA | Working example |
| 65 | 15.6 | 5.1 | 4.04 | 0.03 | 1235 | 985 | 17.2 | 44 | O | O | GA | Working example |
| 66 | 13.8 | 4.9 | 3.99 | 0.01 | 1208 | 960 | 16.8 | 40 | O | O | GI | Working example |
| 67 | 13.5 | 5.4 | 4.28 | 0.04 | 1252 | 980 | 17.1 | 45 | O | O | GI | Working example |
| 68 | 5.4 | 4.3 | 3.85 | 0.02 | 1202 | 965 | 16.3 | 42 | O | O | GA | Working example |
| 69 | 6.6 | 4.7 | 4.13 | 0.01 | 1243 | 973 | 17.2 | 47 | O | O | GA | Working example |
| 70 | 5.3 | 4.9 | 3.96 | 0.02 | 1198 | 945 | 17.3 | 40 | O | O | GI | Working example |
| 71 | 6.9 | 5.2 | 3.85 | 0.01 | 1235 | 964 | 17.8 | 46 | O | O | GI | Working example |
| 72 | 5.2 | 3.5 | 3.65 | 0.02 | 1337 | 1085 | 12.4 | 28 | O | O | GA | Working example |
| 73 | 5.5 | 3.7 | 3.82 | 0.03 | 1358 | 1122 | 11.9 | 32 | O | O | GA | Working example |
| 74 | 30.0 | 3.4 | 6.88 | 0.11 | 1205 | 920 | 16.9 | 38 | O | O | GA | Working example |
| 75 | 31.7 | 3.1 | 4.93 | 0.07 | 1228 | 912 | 16.3 | 40 | O | O | GA | Working example |

TABLE 3-2-continued

| 76 | 32.0 | 3.7 | 4.46 | 0.10 | 1216 | 897 | 16.2 | 35 | ⊙ | O | GA | Working example |

*1: the thickness of a region with a Si concentration not more than one-third of the Si concentration in a chemical composition of a steel sheet and with a Mn concentration not more than one-third of the Mn concentration in the chemical composition of the steel sheet in a region within 4.9 μm in a thickness direction from a surface of the steel sheet
*2: $(T_{Si} + T_{Mn})/(L_{Si} + L_{Mn})$
F: ferrite,
BF: bainitic ferrite
TM: tempered martensite (excluding M and RA),
RA: retained austenite,
M: fresh martensite,
P: pearlite,
θ: carbides, such as cementite,
*CR: cold-rolled steel sheet,
GI: hot-dip galvanized steel sheet,
GA: hot-dip glivannealed steel sheet Table 3 shows that the steel sheets according to the working examples have a tensile strength (TS) of 1180 MPa or more, a high yield stress (YS), high ductility, high stretch-flangeability (hole expandability), high delayed fracture resistance, and high LKE resistance. By contrast, the steel sheets according to the comparative examples were inferior to the working examples in at least one of these.

Example 2

A galvanized steel sheet subjected to galvanizing treatment under the production conditions No. 1 (working example) shown in Table 2 of Example 1 was pressed to produce a member of a working example.

Furthermore, a galvanized steel sheet subjected to a galvanizing treatment under the production conditions No. 1 (working example) in Table 2 of Example 1 and a galvanized steel sheet subjected to a galvanizing treatment under the production conditions No. 3 (working example) in Table 2 of Example 1 were joined by spot welding to produce a member of a working example. These members according to the working examples have high LME cracking resistance rated as "⊙" and delayed fracture resistance cracking properties rated as "O". The members according to the working examples have a tensile strength (TS) of 1180 MPa or more, a high yield stress (YS), high ductility, and high stretch-flangeability (hole expandability). Thus, these members are suitably used for automotive parts and the like.

A steel sheet produced under the production conditions No. 4 (working example) in Table 2 of Example 1 was pressed to produce a member of a working example. Furthermore, a steel sheet produced under the production conditions No. 4 (working example) in Table 2 of Example 1 and a steel sheet produced under the production conditions No. 29 (working example) in Table 2 of Example 1 were joined by spot welding to produce a member of a working example. These members according to the working examples have high LME cracking resistance rated as "O" and delayed fracture resistance cracking properties rated as "O". The members according to the working examples have a tensile strength (TS) of 1180 MPa or more, a high yield stress (YS), high ductility, and high stretch-flangeability (hole expandability). Thus, these members are suitably used for automotive parts and the like.

Example 3

A steel material with the chemical composition of the steel G, U, W, AT, AU, or AX listed in Table 1 and with the remainder composed of Fe and incidental impurities was obtained by steelmaking in a converter and was formed into a steel slab by a continuous casting method. The steel slab was heated to 1250° C. and was subjected to rough rolling. The steel was then subjected to finish rolling at a finish rolling temperature of 900° C. and was coiled at a coiling temperature listed in Table 4 as a hot-rolled steel sheet. Under the conditions shown in Table 4, a cold-rolling step, a first annealing step, and a second annealing step were then performed to produce a cold-rolled steel sheet (CR).

As described below, a steel sheet was then produced through the production process according to a first embodiment or a second embodiment.

In the first embodiment, the second annealing step was followed by reheating treatment under the conditions shown in Table 4. Some of the steel sheets were then subjected to plating treatment under the conditions shown in Table 4. Some of the steel sheets were then subjected to dehydrogenation under the conditions shown in Table 4 to produce steel sheets.

In the second embodiment, the second annealing step was followed by a plating step under the conditions shown in Table 4. A reheating step was then performed under the conditions shown in Table 4 to produce a steel sheet.

In a working example of the first embodiment, the cooling stop temperature after annealing in the second annealing step ranges from 150° C. to 300° C., as shown in Table 2. In a working example of the second embodiment, the cooling stop temperature after annealing in the second annealing step ranges from 350° C. to 500° C.

In the plating step, a cold-rolled steel sheet was subjected to plating treatment to produce a hot-dip galvannealed steel sheet (GA). The hot-dip galvanizing bath was a zinc bath containing Al: 0.14% by mass and the remainder composed of Zn and incidental impurities. The bath temperature was 470° C. The coating weight was approximately 45 g/m² per side (plating on both sides). Alloying treatment was performed at the temperatures shown in Table 2. The composition of the coated layer of GA contained Fe: 7% to 15% by mass, Al: 0.1% to 1.0% by mass, and the remainder composed of Zn and incidental impurities.

TABLE 41

| | | Cold-rolling step | | | Second annealing step | | | | | |
|---|---|---|---|---|---|---|---|---|---|---|
| | | Hot-rolling step | Holding time at | | First annealing step | | | | Average cooling | Cooling |
| No. | Steel type | Coiling temperature (° C.) | 400° C. or more (seconds) | Rolling reduction (%) | Annealing temperature (° C.) | Holding time (seconds) | Annealing temperature (° C.) | Holding time (seconds) | Dew-point temperature (° C.) | rate up to 550° C. (° C./s) | stop temperature (° C.) |
| 77 | G | 600 | 5500 | 55.6 | 850 | 300 | 820 | 350 | 8 | 11 | 400 |
| 78 | U | 550 | 7800 | 66.7 | 850 | 300 | 820 | 350 | 13 | 11 | 200 |
| 79 | W | 500 | 8400 | 60.0 | 850 | 300 | 820 | 350 | 19 | 11 | 400 |
| 80 | AT | 600 | 5500 | 60.0 | 850 | 300 | 800 | 350 | 8 | 11 | 200 |
| 81 | AU | 550 | 7800 | 62.5 | 850 | 300 | 800 | 350 | 13 | 11 | 400 |
| 82 | AX | 500 | 8400 | 64.7 | 850 | 300 | 800 | 350 | 19 | 11 | 400 |

| | Second annealing step Bending and unbending | | Reheating step (first embodiment) | | Plating step | | Dehydrogenation step | | Reheating step (second embodiment) Cooling | | |
|---|---|---|---|---|---|---|---|---|---|---|---|
| No. | Roller radius (mm) | Count (times) | Reheating temperature (° C.) | Holding time (seconds) | Type* | Alloying temperature (° C.) | Processing temperature (° C.) | Holding time (h) | stop temperature (° C.) | Reheating temperature (° C.) | Holding time (seconds) |
| 77 | 500 | 8 | | | GA | 520 | | | 200 | 400 | 50 |
| 78 | 500 | 8 | 400 | 30 | GA | 500 | 80 | 25 | | | |
| 79 | 500 | 8 | | | GA | 490 | | | 200 | 400 | 50 |
| 80 | 500 | 8 | 400 | 30 | GA | 510 | 80 | 25 | | | |
| 81 | 500 | 8 | | | GA | 490 | | | 200 | 400 | 50 |
| 82 | 500 | 8 | | | GA | 480 | | | 200 | 400 | 50 |

*CR: cold-rolled steel sheet (without plating),
GI: hot-dip galvanized steel sheet,
GA: hot-dip gaivannealed steel sheet For the steel sheets and the coated steel sheets used as test steels, tensile properties, stretch-flangeability (hole expandability), LME resistance, and delayed fracture resistance were evaluated in accordance with the following test methods. The ferrite area fraction, the tempered martensite area fraction, the bainitic ferrite area fraction, and the retained austenite volume fraction of each steel sheet were measured by the following methods. The Si concentration and Mn concentration were measured by the following methods in a region within 15.0 μm in the thickness direction from the surface of the steel sheet and at a quarter thickness position of the steel sheet. The thickness of a soft layer present in the thickness direction from the surface of the steel sheet, the average grain size of crystal grains containing an oxide of Si and/or Mn in the region within 15.0 μm in the thickness direction from the surface of the steel sheet, and the amount of diffusible hydrogen in the steel sheet were also measured by the methods described above. Table 5 shows the results.

The ferrite, bainitic ferrite, and tempered martensite area fractions are measured by the following method. The area fractions were measured at a quarter thickness position.

A sample was cut such that a cross section of a steel sheet in the thickness direction parallel to the rolling direction became an observation surface. The observation surface was then mirror-polished with a diamond paste, was finally polished with colloidal silica, and was etched with 3% by volume nital to expose a microstructure. Three fields in a 17 μm×23 μm field range were observed with a scanning electron microscope (SEM) at an accelerating voltage of 15 kV and at a magnification of 5000 times. In a microstructure image thus taken, the area fraction was calculated by dividing the area of each constituent microstructure (ferrite, bainitic ferrite, tempered martensite) by the measurement area in three fields using Adobe Photoshop available from Adobe Systems, and the area fractions were averaged to determine the area fraction of each microstructure.

The retained austenite volume fraction is measured by the following method. A steel sheet was mechanically ground in the thickness direction (depth direction) to a quarter thickness and was then chemically polished with oxalic acid to form an observation surface. The observation surface was observed by X-ray diffractometry.

A Mo Kα radiation source was used for incident X-rays. The ratio of the diffraction intensities of (200), (220), and (311) planes of fcc iron (austenite) to the diffraction intensities of (200), (211), and (220) planes of bcc iron was determined as the retained austenite volume fraction.

The other steel sheet microstructure (remaining microstructure) was determined by SEM observation.

The Si concentration $T_{Si}$ and the Mn concentration $T_{Mn}$ at a quarter thickness position of a steel sheet were determined with a field emission-electron probe micro analyzer (FE-EPMA) from the average of 10 points of point analysis at an electron beam diameter of 1 μm at a quarter thickness position of the steel sheet. For the Si concentration in the region within 15.0 μm in the thickness direction from the surface of the steel sheet, the concentration distribution of the Si concentration in the range of 0 to 15.0 μm in the thickness direction from the surface of the steel sheet was determined by line analysis with a field emission-electron probe micro analyzer at an electron beam diameter of 0.1 μm from the surface of the steel sheet in the thickness direction. The lowest Si concentration in the concentration distribution is defined as the concentration $L_{Si}$. Also for the Mn concentration in a region within 15.0 μm in a thickness direction from a surface of a steel sheet, the concentration distribution of the Mn concentration in the range of 0 to 15.0 μm in the thickness direction from the surface of the steel sheet was determined by line analysis with a field emission-electron probe micro analyzer at an electron beam diameter of 0.1 μm from the surface of the steel sheet in the thickness direction. The lowest Mn concentration in the concentration distribution is defined as the concentration $L_{Mn}$. The Si concentration, the Mn concentration, $L_{Si}$, $T_{Si}$, $L_{Mn}$, and $T_{Mn}$ are expressed in % by mass. In the measurement of the Si concentration and the Mn concentration with a field emission-electron probe micro analyzer in the disclosed embodiments, 10 positions without particulate matter are measured and averaged as the Si concentration and the Mn concentration.

SEM observation and energy dispersive X-ray analysis (EDX) on a cross section (L cross section) of a steel sheet were performed to determine the type of oxide in the region within 15.0 μm in the thickness direction from the surface of the steel sheet and to measure the average grain size of crystal grains containing an oxide of Si and/or Mn. The average grain size of crystal grains is the average length of grain sizes measured by microtomy in a cross section (L cross section) of a steel sheet in a direction parallel to the surface of the steel sheet.

Measurement is performed on the soft layer as described below. After smoothing a thickness cross section (L cross section: a cross section parallel to the rolling direction and perpendicular to the surface of the steel sheet) parallel to the rolling direction of the steel sheet by wet grinding, measurement was performed with a Vickers hardness tester at a load of 10 gf from a 1-μm position to a 100-μm position in the thickness direction from the surface of the steel sheet at intervals of 1 μm. Measurement was then performed at intervals of 20 μm to the central portion in the thickness direction. A region with hardness corresponding to 65% or less of the hardness at a quarter thickness position is defined as a soft layer, and the thickness of the region in the thickness direction is defined as the thickness of the soft layer.

The amount of diffusible hydrogen in a steel sheet is measured by the following method.

For a cold-rolled steel sheet, a test specimen 30 mm in length and 5 mm in width was taken. For a steel sheet with a hot-dip galvanized layer or a hot-dip galvannealed layer on its surface, a test specimen 30 mm in length and 5 mm in width was taken, and the hot-dip galvanized layer or hot-dip galvannealed layer was removed with alkali. The amount of hydrogen released from the test specimen was then measured by a temperature-programmed desorption analysis method. More specifically, a test specimen is continuously heated from room temperature to 300° C. at a heating rate of 200° C./h and is then cooled to room temperature. The cumulative amount of hydrogen released from the test specimen from room temperature to 210° C. is measured as the amount of diffusible hydrogen in the steel sheet.

<Tensile Properties>

The tensile test was performed in accordance with JIS Z 2241. A JIS No. 5 test specimen was taken from the steel sheet such that the longitudinal direction was perpendicular to the rolling direction of the steel sheet. The YS, TS, and total elongation (El) of the test specimen were measured at a crosshead speed of 10 mm/min in the tensile test. In the disclosed embodiments, TS of 1180 MPa or more and YS and El satisfying the following conditions were judged to be acceptable.

If 1180 MPa≤TS<1320 MPa, then 700 MPa≤YS, and 13%≤El

If 1320 MPa≤TS<1470 MPa, then 850 MPa≤YS, and 11%≤El

If 1470 MPa≤TS, then 1000 MPa≤YS, and 9%≤El

<Stretch-Flangeability (Hole Expandability)>

The stretch-flangeability (hole expandability) was evaluated in a hole expanding test. The hole expanding test was performed in accordance with JIS Z 2256. A 100 mm×100 mm sample was taken by shearing from the steel sheet. A hole with a diameter of 10 mm was punched in the sample with a clearance of 12.5%. While the periphery of the hole was held using a die with an inner diameter of 75 mm at a blank holding force of 9 ton (88.26 kN), the hole diameter at the crack initiation limit was measured by pushing a conical punch with a vertex angle of 60 degrees into the hole. The critical hole expansion ratio λ (%) was calculated using the following formula, and the hole expandability was evaluated from the critical hole expansion ratio.

$$\lambda(\%) = \{(D_f - D_0)/D_0\} \times 100$$

In this formula, $D_f$ denotes the hole diameter (mm) at the time of cracking, and $D_0$ denotes the initial hole diameter (mm). In the disclosed embodiments, when λ was 20% or more, the stretch-flangeability was judged to be good.

<LME Resistance>

The LME resistance was determined by a resistance welding cracking test. A test specimen of a steel sheet cut to 30 mm×100 mm in a longitudinal direction perpendicular to the rolling direction and another test specimen made of a 980 MPa grade hot-dip galvanized steel sheet were subjected to resistance welding (spot welding) to produce a member. A set of the two steel sheets tilted 5 degrees was subjected to resistance spot welding in a servomotor pressurization type single-phase alternating current (50 Hz) resistance welding machine attached to a welding gun. The welding conditions included a welding pressure of 3.8 kN and a holding time of 0.2 seconds. The welding current ranged from 5.7 to 6.2 kA, the weld time was 21 cycles, and the holding time was 5 cycles. A test specimen was cut in half after the welding, and a cross section was observed with an optical microscope. A test specimen with no crack of 0.02 mm or more was judged to be very good LME cracking (⊙), a test specimen with a crack of 0.02 mm or more and less than 0.1 mm was judged to be good LME cracking (O), and a test specimen with a crack of 0.1 mm or more was judged to be poor LME cracking (X).

<Delayed Fracture Resistance>

The delayed fracture resistance was evaluated in a hydrochloric acid immersion test of a V-bending sample subjected to stress. A test specimen 1.4 mm in thickness, 30 mm in width, and 110 mm in length was taken by shearing. A Φ15 mm hole centered at the center of the width and at 17.5 mm from a longitudinal end of the test specimen was punched. The conditions for the shearing were as follows: with a blank holder, at a shear rake angle of 0.5 degrees, at a shear clearance of 15%, and with a shear blade used 1000 shots or more. The test specimen was then subjected to 90-degree V-bending at R/t=5.0, wherein the bend radius (R) was divided by the thickness (t), and the tightening of a bolt through the Φ15 mm hole was adjusted such that the stress at the top of the V-bending was the YS of the material ±50 MPa. The V-bending sample subjected to the stress was immersed in hydrochloric acid and was checked for cracks. The conditions for the immersion were as follows: an immersion solution of hydrochloric acid with pH=3 under constant control, a liquid temperature of 25° C., and an immersion time of 96 hours. In the disclosed embodiments, no crack of 1 mm or more after the hydrochloric acid immersion test was judged to be high delayed fracture resistance (○), and a crack of 1 mm or more was judged to be low delayed fracture resistance (X).

Table 5 shows the results.

"○". The members according to the working examples have a tensile strength (TS) of 1180 MPa or more, a high yield stress (YS), high ductility, and high stretch-flangeability

TABLE 5

| No. | Steel type | Thickness (mm) | F area fraction (%) | BF area fraction (%) | TM area fraction (%) | RA volume fraction (%) | Remaining microstructure | *1 (μm) | $L_{Si}$ (mass %) | $L_{Mn}$ (mass %) | $T_{Si}$ (mass %) | $T_{Mn}$ (mass %) | *2 |
|---|---|---|---|---|---|---|---|---|---|---|---|---|---|
| 77 | G | 1.6 | 14 | 17 | 39 | 12 | M, θ | 6.2 | 0.28 | 0.41 | 1.50 | 2.89 | 6.4 |
| 76 | U | 1.2 | 15 | 18 | 40 | 13 | M, θ | 9.2 | 0.27 | 0.45 | 1.50 | 2.89 | 6.1 |
| 79 | W | 1.2 | 14 | 17 | 42 | 12 | M, θ | 13.5 | 0.31 | 0.42 | 1.50 | 2.89 | 6.0 |
| 80 | AT | 1.6 | 12 | 13 | 48 | 11 | M, θ | 6.9 | 0.15 | 0.42 | 0.85 | 2.89 | 6.6 |
| 81 | AU | 1.2 | 13 | 12 | 43 | 12 | M, θ | 9.8 | 0.17 | 0.48 | 0.85 | 2.89 | 5.8 |
| 82 | AX | 1.2 | 13 | 12 | 48 | 11 | M, θ | 13.9 | 0.13 | 0.49 | 0.85 | 2.89 | 8.0 |

| No. | Thickness of soft later (μm) | Average grain size of crystal grains containing oxide of Si and/or Mn (μm) | $T_{Mn}/L_{Mn}$ | Amount of diffusible hydrogen (mass ppm) | TS (MPa) | YS (MPa) | El (%) | λ (%) | Resistance to LME | Delayed fracture resistance | Type* | Notes |
|---|---|---|---|---|---|---|---|---|---|---|---|---|
| 77 | 34.8 | 4.2 | 7.05 | 0.07 | 1230 | 910 | 16.2 | 37 | ⊙ | O | GA | Working example |
| 76 | 41.9 | 5.8 | 6.42 | 0.09 | 1212 | 875 | 16.8 | 42 | ⊙ | O | GA | Working example |
| 79 | 48.6 | 6.3 | 6.88 | 0.09 | 1195 | 860 | 17.2 | 46 | ⊙ | O | GA | Working example |
| 80 | 35.3 | 4.4 | 6.88 | 0.11 | 1224 | 915 | 15.9 | 34 | ⊙ | O | GA | Working example |
| 81 | 42.8 | 5.3 | 6.02 | 0.08 | 1207 | 890 | 16.1 | 44 | ⊙ | O | GA | Working example |
| 82 | 49.1 | 6.0 | 5.90 | 0.07 | 1191 | 855 | 16.9 | 48 | ⊙ | O | GA | Working example |

*1: the thickness of a region with a Si concentration not more than one-third of the Si concentration in a chemical composition of a steel sheet and with a Mn concentration not more than one-third of the Mn concentration in the chemical composition of the steel sheet in a region within 4.9 μm in a thickness direction from a surface of the steel sheet
*2: $(T_{Si} + T_{Mn})/(L_{Si} + L_{Mn})$
F: ferrite,
BF: bainitic ferrite
TM: tempered martensite (excluding M and RA),
RA: retained austenite,
M: fresh martensite,
P: pearlite,
θ: carbides, such as cementite,
*CR: cold-rolled steel sheet,
GI: hot-dip galvanized steel sheet,
GA: hot-dip glivannealed steel sheet Table 5 shows that the steel sheets according to the working examples have a tensile strength (TS) of 1180 MPa or more, a high yield stress (YS), high ductility, high stretch-flangeability (hole expandability), good fatigue properties, and high LME resistance. By contrast, the steel sheets according to the comparative examples were inferior to the working examples in at least one of these.

Example 4

A galvanized steel sheet subjected to galvanizing treatment under the production conditions No. 77 (working example) shown in Table 4 of Example 3 was pressed to produce a member of a working example. Furthermore, a galvanized steel sheet subjected to a galvanizing treatment under the production conditions No. 77 (working example) in Table 2 of Example 1 and a galvanized steel sheet subjected to a galvanizing treatment under the production conditions No. 80 (working example) in Table 2 of Example 1 were joined by spot welding to produce a member of a working example. These members according to the working examples have high LME cracking resistance rated as "⊙" and delayed fracture resistance cracking properties rated as (hole expandability). Thus, these members are suitably used for automotive parts and the like.

The invention claimed is:
1. A steel sheet having a chemical composition comprising, by mass %:
Si: 0.20% to 2.00%;
Mn: 2.70% to 4.00%;
C: 0.120% to 0.400%;
P: 0.001% to 0.100%;
S: 0.0200% or less;
Al: 0.010% to 2.000%;
N: 0.0100% or less;
optionally at least one selected from the group consisting of:
  Sb: 0.200% or less, and
  Sn: 0.200% or less
optionally at least one selected from the group consisting of:
  Ti: 0.200% or less,
  Nb: 0.200% or less,
  V: 0.100% or less,
  B: 0.0100% or less,

Cu: 1.000% or less,
Cr: 1.000% or less,
Ni: 1.000% or less,
Mo: 0.500% or less,
Ta: 0.100% or less,
W: 0.500% or less,
Mg: 0.0200% or less,
Zn: 0.020% or less,
Co: 0.020% or less,
Zr: 0.020% or less,
Ca: 0.0200% or less,
Ce: 0.0200% or less,
Se: 0.0200% or less,
Te: 0.0200% or less,
Ge: 0.0200% or less,
As: 0.0200% or less,
Sr: 0.0200% or less,
Cs: 0.0200% or less,
Hf: 0.0200% or less,
Pb: 0.0200% or less,
Bi: 0.0200% or less, and
REM (except Ce): 0.0200% or less;
optionally an equivalent carbon content Ceq of 0.697% or more;
the remainder being Fe and incidental impurities,
wherein:
the steel has a microstructure including a ferrite area fraction in a range of 5% to 30%, a bainitic ferrite area fraction in a range of 5% to 35%, a tempered martensite area fraction in a range of 20% to 50%, and a retained austenite volume fraction in a range of 5% to 35%,
in a region within 4.9 μm in a thickness direction from a surface of the steel sheet, a region with a Si concentration not more than one-third of the Si concentration in the chemical composition of the steel sheet and with a Mn concentration not more than one-third of the Mn concentration in the chemical composition of the steel sheet has a thickness of 1.0 μm or more,
the lowest Si concentration $L_{Si}$ and the lowest Mn concentration $L_{Mn}$ in the region within 4.9 μm in the thickness direction from the surface of the steel sheet and a Si concentration $T_{Si}$ and a Mn concentration $T_{Mn}$ at a quarter thickness position of the steel sheet satisfy the following formula (1):

$$L_{Si}+L_{Mn} \leq (T_{Si}+T_{Mn})/4 \quad (1),$$

the steel sheet has a tensile strength of 1180 MPa or more, and
optionally, an amount of diffusible hydrogen in the steel sheet is 0.50 ppm or less by mass.

2. The steel sheet according to claim 1, wherein:
the steel sheet comprises a soft layer with a thickness in a range of 1.0 to 50.0 μm in the thickness direction, the soft layer being a region with hardness corresponding to 65% or less of the hardness at a quarter thickness position from the surface of the steel sheet,
optionally crystal grains containing an oxide of Si and/or Mn in the region within 4.9 μm in the thickness direction from the surface of the steel sheet have an average grain size in a range of 1 to 15 μm
optionally the Mn concentration $L_{Mn}$ and the Mn concentration $T_{Mn}$ satisfy the following formula (2):

$$L_{Mn} \leq T_{Mn}/3 \quad (2).$$

3. The steel sheet according to claim 1, wherein the steel sheet comprises a hot-dip galvanized layer or a hot-dip galvannealed layer on a surface of the steel sheet.

4. A member produced by performing at least one of forming and welding on the steel sheet according to claim 1.

5. A method for producing the steel sheet according to claim 1, the method comprising:
a hot-rolling step of hot-rolling a steel slab with the chemical composition followed by coiling at a coiling temperature in a range of 450° C. to 750° C.;
a cold-rolling step of holding the steel sheet after the hot-rolling step in a temperature range of 400° C. or more for 3600 seconds or more, pickling the steel sheet, and cold-rolling the steel sheet at a rolling reduction of 30% or more;
a first annealing step of holding the steel sheet after the cold-rolling step in a first annealing temperature range of 820° C. or more for 20 seconds or more;
a second annealing step of holding the steel sheet after the first annealing step in an atmosphere with a dew-point temperature of −35° C. or more in a second annealing temperature range of 740° C. to 900° C. for 20 seconds or more, cooling the steel sheet, at an average cooling rate of 8° C./s or more from the second annealing temperature range to 550° C., to a cooling stop temperature in a range of 150° C. to 300° C., and bending and unbending the steel sheet 3 to 15 times in total using a roller having a radius in a range of 100 to 1000 mm during the cooling from 740° C. to the cooling stop temperature;
a reheating step of reheating the steel sheet after the second annealing step to a reheating temperature range of (the cooling stop temperature +50° C.) to 500° C. and holding the steel sheet in the reheating temperature range for 10 seconds or more;
optionally a plating step of performing hot-dip galvanizing on the steel sheet after the reheating step or performing the hot-dip galvanizing followed by reheating to a temperature in a range of 450° C. to 600° C. and performing alloying treatment; and
optionally a dehydrogenation step of holding the steel sheet in a range of 50° C. to 300° C. for 0.5 to 72.0 hours after the reheating step.

6. A method for producing the steel sheet according to claim 1, the method comprising:
a hot-rolling step of hot-rolling a steel slab with the chemical composition followed by coiling at a coiling temperature in a range of 450° C. to 750° C.;
a cold-rolling step of holding the steel sheet after the hot-rolling step in a temperature range of 400° C. or more for 3600 seconds or more, pickling the steel sheet, and cold-rolling the steel sheet at a rolling reduction of 30% or more;
a first annealing step of holding the steel sheet after the cold-rolling step in a first annealing temperature range of 820° C. or more for 20 seconds or more;
a second annealing step of holding the steel sheet after the first annealing step in an atmosphere with a dew-point temperature of −35° C. or more in a second annealing temperature range of 740° C. to 900° C. for 20 seconds or more, cooling the steel sheet, at an average cooling rate of 8° C./s or more from the second annealing temperature range to 550° C., to a cooling stop temperature in a range of 350° C. to 500° C., and bending and unbending the steel sheet 3 to 15 times in total using a roller having a radius in a range of 100 to 1000 mm during the cooling from 740° C. to the cooling stop temperature;
a plating step of performing hot-dip galvanizing on the steel sheet after the second annealing step or performing the hot-dip galvanizing followed by reheating to a temperature in a range of 450° C. to 600° C. and performing alloying treatment; a reheating step of cooling the steel sheet after the plating step to a cooling stop temperature in a range of 50° C. to 350° C., reheating the steel sheet to a reheating temperature exceeding the cooling stop temperature and in a range of 300° C. to 500° C., and holding the reheating temperature for 10 seconds or more; and optionally a dehydrogenation step of holding the steel sheet in a range of 50° C. to 300° C. for 0.5 to 72.0 hours after the reheating step.

7. A method for producing a member, the method comprising performing at least one of forming and welding on the steel sheet produced by the method for producing the steel sheet according to claim 5.

8. A steel sheet having a chemical composition comprising, by mass %:
Si: 0.20% to 2.00%;
Mn: 2.70% to 4.00%;
C: 0.120% to 0.400%;
P: 0.001% to 0.100%;
S: 0.0200% or less;
Al: 0.010% to 2.000%;
N: 0.0100% or less;
optionally at least one selected from the group consisting of:
  Sb: 0.200% or less, and
  Sn: 0.200% or less
optionally at least one selected from the group consisting of:
  Ti: 0.200% or less,
  Nb: 0.200% or less,
  V: 0.100% or less,
  B: 0.0100% or less,
  Cu: 1.000% or less,
  Cr: 1.000% or less,
  Ni: 1.000% or less,
  Mo: 0.500% or less,
  Ta: 0.100% or less,
  W: 0.500% or less,
  Mg: 0.0200% or less,
  Zn: 0.020% or less,
  Co: 0.020% or less,
  Zr: 0.020% or less,
  Ca: 0.0200% or less,
  Ce: 0.0200% or less,
  Se: 0.0200% or less,
  Te: 0.0200% or less,
  Ge: 0.0200% or less,
  As: 0.0200% or less,
  Sr: 0.0200% or less,
  Cs: 0.0200% or less,
  Hf: 0.0200% or less,
  Pb: 0.0200% or less,
  Bi: 0.0200% or less, and
  REM (except Ce): 0.0200% or less;
optionally an equivalent carbon content Ceq of 0.697% or more;
the remainder being Fe and incidental impurities,
wherein:
the steel sheet has a microstructure including a ferrite area fraction in a range of 5% to 30%, a bainitic ferrite area fraction in a range of 5% to 35%, a tempered martensite area fraction in a range of 20% to 50%, and a retained austenite volume fraction in a range of 5% to 35%, in a region within 15.0 μm in a thickness direction from a surface of the steel sheet, a region with a Si concentration not more than one-third of the Si concentration in the chemical composition of the steel sheet and with a Mn concentration not more than one-third of the Mn concentration in the chemical composition of the steel sheet has a thickness of 1.0 μm or more, the lowest Si concentration $L_{Si}$ and the lowest Mn concentration $L_{Mn}$ in the region within 15.0 μm in the thickness direction from the surface of the steel sheet and a Si concentration $T_{Si}$ and a Mn concentration $T_{Mn}$ at a quarter thickness position of the steel sheet satisfy the following formula (1):

$$L_{Si}+L_{Mn} \leq (T_{Si}+T_{Mn})/4 \tag{1}$$

the steel sheet has a tensile strength of 1180 MPa or more, and optionally, an amount of diffusible hydrogen in the steel sheet is 0.50 ppm or less by mass.

9. The steel sheet according to claim 8, wherein:
the steel sheet comprises a soft layer with a thickness in a range of 1.0 to 50.0 μm in the thickness direction, the soft layer being a region with hardness corresponding to 65% or less of the hardness at a quarter thickness position from the surface of the steel sheet.

10. The steel sheet according to claim 8, wherein the steel sheet comprises a hot-dip galvanized layer or a hot-dip galvannealed layer on a surface of the steel sheet.

11. A member produced by performing at least one of forming and welding on the steel sheet according to claim 8.

12. A method for producing the steel sheet according to claim 8, the method comprising:
a hot-rolling step of hot-rolling a steel slab with the chemical composition followed by coiling at a coiling temperature in a range of 450° C. to 750° C.;
a cold-rolling step of holding the steel sheet after the hot-rolling step in a temperature range of 400° C. or more for 3600 seconds or more, pickling the steel sheet, and cold-rolling the steel sheet at a rolling reduction of 30% or more;
a first annealing step of holding the steel sheet after the cold-rolling step in a first annealing temperature range of 820° C. or more for 20 seconds or more;
a second annealing step of holding the steel sheet after the first annealing step in an atmosphere with a dew-point temperature of −35° C. to 20° C. in a second annealing temperature range of 740° C. to 900° C. for 20 seconds or more, cooling the steel sheet, at an average cooling rate of 8° C./s or more from the second annealing temperature range to 550° C., to a cooling stop temperature in a range of 150° C. to 300° C., and bending and unbending the steel sheet 3 to 15 times in total using a roller having a radius in a range of 100 mm to 1000 mm during the cooling from 740° C. to the cooling stop temperature;
a reheating step of reheating the steel sheet after the second annealing step to a reheating temperature range of (the cooling stop temperature +50° C.) to 500° C. and holding the steel sheet in the reheating temperature range for 10 seconds or more;
optionally a plating step of performing hot-dip galvanizing on the steel sheet after the reheating step or performing the hot-dip galvanizing followed by reheating to a temperature in a range of 450° C. to 600° C. and performing alloying treatment; and optionally a dehydrogenation step of holding the steel sheet in a range of 50° C. to 300° C. for 0.5 to 72.0 hours after the reheating step.

13. A method for producing the steel sheet according to claim 8, the method comprising:
- a hot-rolling step of hot-rolling a steel slab with the chemical composition followed by coiling at a coiling temperature in a range of 450° C. to 750° C.;
- a cold-rolling step of holding the steel sheet after the hot-rolling step in a temperature range of 400° C. or more for 3600 seconds or more, pickling the steel sheet, and cold-rolling the steel sheet at a rolling reduction of 30% or more;
- a first annealing step of holding the steel sheet after the cold-rolling step in a first annealing temperature range of 820° C. or more for 20 seconds or more;
- a second annealing step of holding the steel sheet after the first annealing step in an atmosphere with a dew-point temperature of −35° C. to 20° C. in a second annealing temperature range of 740° C. to 900° C. for 20 seconds or more, cooling the steel sheet, at an average cooling rate of 8° C./s or more from the second annealing temperature range to 550° C., to a cooling stop temperature in a range of 350° C. to 500° C., and bending and unbending the steel sheet 3 to 15 times in total using a roller having a radius in a range of 100 to 1000 mm during the cooling from 740° C. to the cooling stop temperature;
- a plating step of performing hot-dip galvanizing on the steel sheet after the second annealing step or performing the hot-dip galvanizing followed by reheating to a temperature in a range of 450° C. to 600° C. and performing alloying treatment;
- a reheating step of cooling the steel sheet after the plating step to a cooling stop temperature in a range of 50° C. to 350° C., reheating the steel sheet to a reheating temperature exceeding the cooling stop temperature and in a range of 300° C. to 500° C., and holding the reheating temperature for 10 seconds or more; and
optionally a dehydrogenation step of holding the steel sheet in a range of 50° C. to 300° C. for 0.5 to 72.0 hours after the reheating step.

14. A method for producing a member, the method comprising performing at least one of forming and welding on the steel sheet produced by the method for producing the steel sheet according to claim 12.

15. The steel sheet according to claim 2, wherein the steel sheet comprises a hot-dip galvanized layer or a hot-dip galvannealed layer on a surface of the steel sheet.

16. A member produced by performing at least one of forming and welding on the steel sheet according to claim 2.

17. A member produced by performing at least one of forming and welding on the steel sheet according to claim 3.

18. A member produced by performing at least one of forming and welding on the steel sheet according to claim 15.

19. A method for producing a member, the method comprising performing at least one of forming and welding on the steel sheet produced by the method for producing the steel sheet according to claim 6.

20. The steel sheet according to claim 9, wherein the steel sheet comprises a hot-dip galvanized layer or a hot-dip galvannealed layer on a surface of the steel sheet.

21. A member produced by performing at least one of forming and welding on the steel sheet according to claim 9.

22. A member produced by performing at least one of forming and welding on the steel sheet according to claim 10.

23. A member produced by performing at least one of forming and welding on the steel sheet according to claim 20.

24. A method for producing a member, the method comprising performing at least one of forming and welding on the steel sheet produced by the method for producing the steel sheet according to claim 13.

* * * * *